(12) United States Patent
Tsuda et al.

(10) Patent No.: US 8,654,148 B2
(45) Date of Patent: Feb. 18, 2014

(54) DISPLAY CONTROL APPARATUS FOR DECIDING A RETRIEVAL RANGE FOR DISPLAYING STORED PIECES OF INFORMATION

(75) Inventors: Takamoto Tsuda, Kanagawa (JP); Itsuki Asanuma, Tokyo (JP); Yutaka Shiba, Tokyo (JP)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 76 days.

(21) Appl. No.: 13/183,517

(22) Filed: Jul. 15, 2011

(65) Prior Publication Data

US 2012/0162249 A1 Jun. 28, 2012

Related U.S. Application Data

(60) Provisional application No. 61/426,601, filed on Dec. 23, 2010.

(51) Int. Cl.
*G09G 5/00* (2006.01)
*G09G 5/14* (2006.01)
*G06T 11/00* (2006.01)
*G06T 11/60* (2006.01)
*G06T 19/00* (2011.01)

(52) U.S. Cl.
CPC *G09G 5/14* (2013.01); *G06T 11/00* (2013.01); *G06T 11/60* (2013.01); *G06T 19/00* (2013.01); *G06T 19/006* (2013.01)
USPC ........... 345/629; 345/630; 345/631; 345/632; 345/633; 345/634; 345/635; 345/636; 345/637; 345/638; 345/650; 345/676

(58) Field of Classification Search
CPC .......... G09G 5/14; G06T 11/00; G06T 19/00
USPC ................................. 345/629–638
See application file for complete search history.

(56) References Cited

U.S. PATENT DOCUMENTS

| | | | |
|---|---|---|---|
| 2004/0135890 A1* | 7/2004 | Kaneko et al. | 348/207.1 |
| 2007/0103565 A1* | 5/2007 | Xu et al. | 348/231.2 |
| 2007/0110338 A1* | 5/2007 | Snavely et al. | 382/305 |
| 2007/0279438 A1* | 12/2007 | Takakura et al. | 345/629 |
| 2008/0309795 A1* | 12/2008 | Mitsuhashi et al. | 348/231.99 |
| 2009/0089837 A1* | 4/2009 | Momosaki | 725/40 |
| 2009/0290047 A1* | 11/2009 | Sogoh et al. | 348/240.99 |
| 2010/0149212 A1* | 6/2010 | Fukuya et al. | 345/629 |

(Continued)

FOREIGN PATENT DOCUMENTS

JP 2010-154047 7/2010

*Primary Examiner* — Jin-Cheng Wang
(74) *Attorney, Agent, or Firm* — Oblon, Spivak, McClelland, Maier & Neustadt, L.L.P.

(57) ABSTRACT

A display apparatus including an information selecting unit, a retrieval range deciding unit, and a retrieving unit. The information selecting unit selects at least one piece of information from a plurality of pieces of information stored in a memory, each of the plurality of pieces of information being attached with additional information. The retrieval deciding unit decides a retrieval range on the basis of the additional information attached to each piece of the information selected by the information selecting unit. The retrieving unit retrieves and outputs additional pieces of information of the plurality of pieces of information corresponding to the retrieval range decided by the retrieval-direction/retrieval-range deciding unit from the memory.

13 Claims, 18 Drawing Sheets

(56) References Cited

U.S. PATENT DOCUMENTS

2010/0321406 A1* 12/2010 Iwase et al. .................. 345/638
2011/0122153 A1*  5/2011 Okamura et al. ............. 345/629
2011/0159885 A1*  6/2011 Song et al. .................. 455/456.1
2011/0187741 A1*  8/2011 Akiya et al. .................. 345/625
2011/0200980 A1*  8/2011 Takahashi et al. ............ 434/365

* cited by examiner

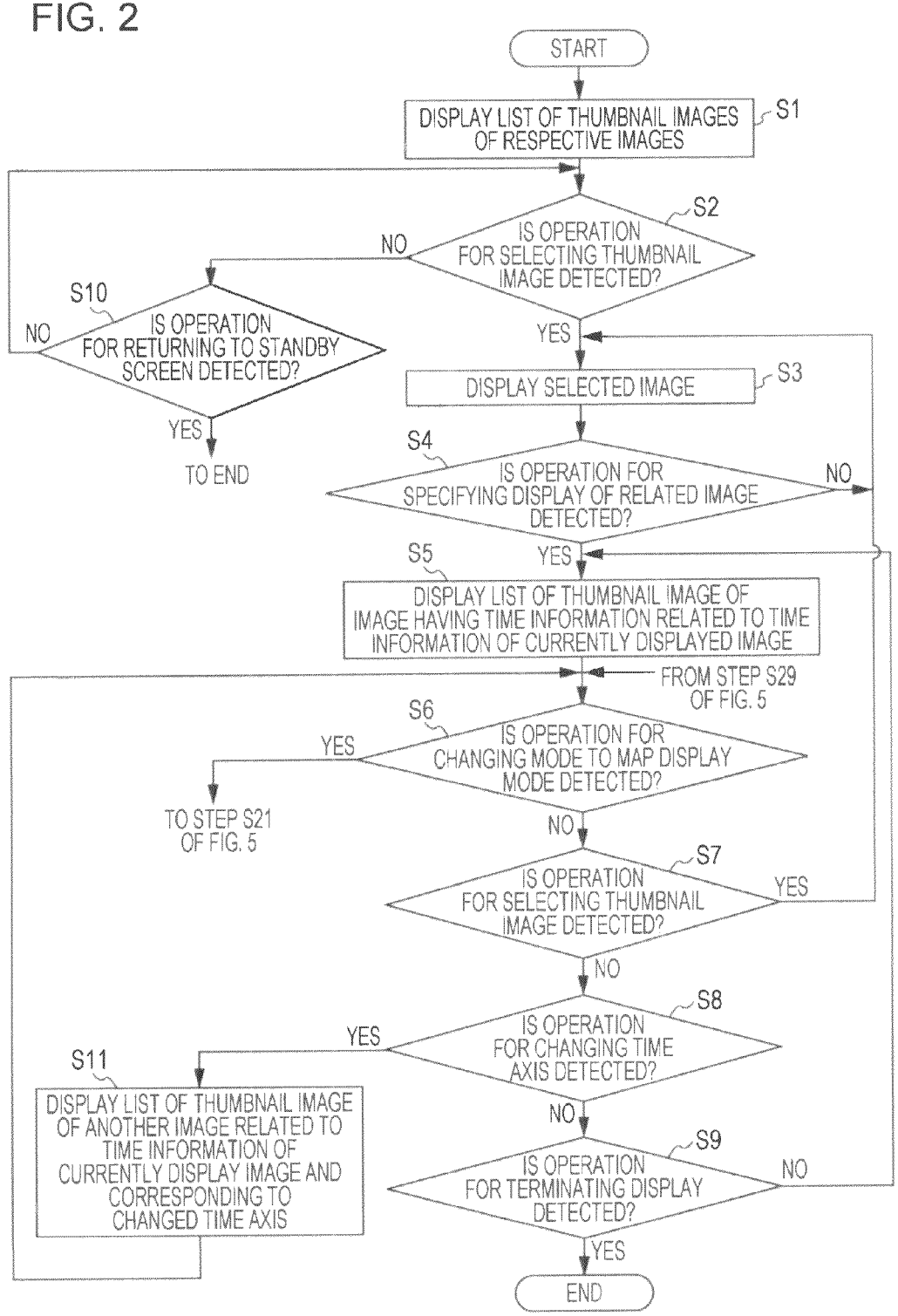

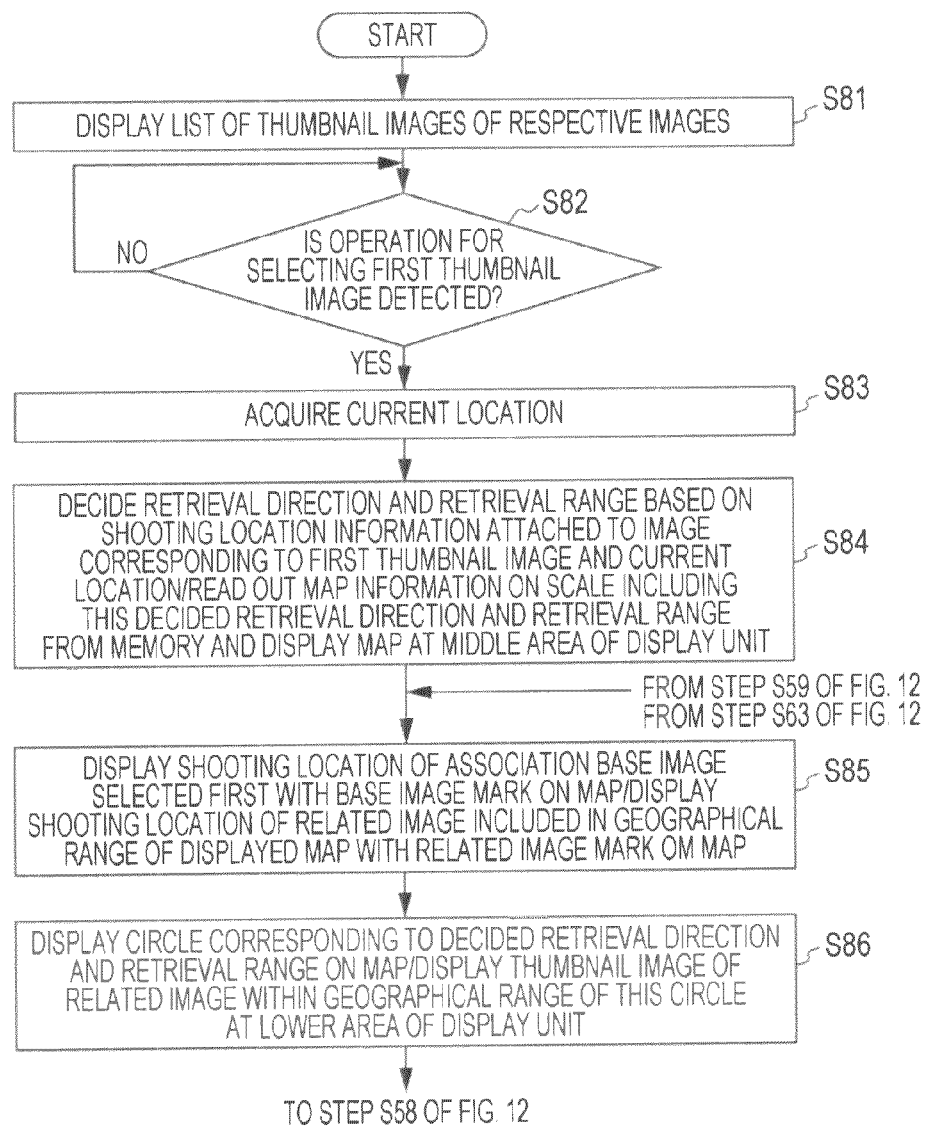

DISPLAY CONTROL APPARATUS FOR DECIDING A RETRIEVAL RANGE FOR DISPLAYING STORED PIECES OF INFORMATION

CROSS REFERENCE TO RELATED APPLICATIONS

This application is related to and claims priority under 35 U.S.C. §119(e) to Provisional Application Ser. No. 61/426,601, filed Dec. 23, 2010, the contents of which are hereby incorporated herein by reference.

BACKGROUND

1. Field

The present specification relates to display control apparatuses for retrieving and displaying other information related to information specified by users on the basis of additional information, such as location information, date information, and time information, attached to, for example, still image information, moving image information, music information, document information, and so on.

In particular, the present specification relates a display control apparatus for allowing the users to easily and freely change the additional information for use in the retrieval of the other related information, thereby allowing the users to easily and freely change a range of the retrieval and rapidly retrieving and displaying information desired by the users.

2. Description of the Related Art

An applicant of the present specification has studied arts related to the preset specification and found existence of a mobile information terminal disclosed in "Japanese Unexamined Patent Application Publication No. 2010-154047" (Patent Literature 1).

In the mobile information terminal disclosed in this Patent Literature 1, location information acquiring means generates current location information on the basis of a GPS signal received from a GPS satellite (GPS: Global Positioning System) once an image of a subject is shot by a camera. Additionally, map image acquiring means accesses a map information providing site to acquire a map image corresponding to the current location information. Shooting location information registering means stores the generated current location information and the acquired map image in a memory in association with the camera image.

Since such a mobile information terminal automatically receive the signal from the GPS satellite and generate the current location information on the basis of an image shooting operation of the camera, the mobile information terminal is configured to be able to improve operability in acquisition of the current location information at the time of shooting.

Additionally, since the mobile information terminal stores the map image acquired by accessing the map information providing site and the current location information in association with the camera image, the users can cause the mobile information terminal to display the map image around the shooting location by selecting the camera image and instructing the mobile information terminal to display the shooting location information.

CITATION LIST

Patent Literature

[PTL 1] Japanese Unexamined Patent Application Publication No. 2010-154047.

Meanwhile, it is possible to retrieve and display, for example, a plurality of pieces of moving image information shot on the same date or a plurality of pieces of still image information shot at the same place by storing image information, such as still image information and moving image information, attached with additional information, such as shooting location information and shooting date and time information.

However, in general, a retrieval value input by users and a retrieval result obtained on the basis of this retrieval value are uniquely associated. Accordingly, a desired retrieval result may not be obtained because information desired by the users is excluded from retrieval or many pieces of information are retrieved, for example. In this case, the users again input a different retrieval value to perform re-retrieval.

More specifically, for example, when retrieving a desired still image, a user inputs a date on which the still image seems to be shot based on their memory. A retrieval apparatus sets this date input by the user as the retrieval value, retrieves still image information attached with date information corresponding to the date input by the user with reference to date information attached to each piece of still image information, and displays a list of thumbnail images thereof or the like.

If a thumbnail image of the desired still image exists in this displayed list of the thumbnail images or the like, the user specifies the thumbnail image to perform a display operation. In this way, the still image corresponding to the specified thumbnail image is displayed.

In contrast, if the thumbnail image of the desired still image does not exist in the displayed list of the thumbnail images or the like, the user again inputs another date on which the still image seems to be shot to perform re-retrieval. The user repeatedly performs such a re-retrieval operation until the desired still image is found. Repeatedly performing such a troublesome re-retrieval operation cause a problem that a long time is needed until the desired information is retrieved.

BRIEF SUMMARY

The present specification is made in view of the above-described problems and an object thereof is to provide a display control apparatus capable of rapidly retrieving and displaying desired information without making users perform troublesome repeated operations by allowing the users to easily and freely change a retrieval range on the basis of a retrieval result.

Solution to Problem

To solve the foregoing problem, according to an embodiment, a display control apparatus includes: an information selecting unit that selects at least one piece of information from a plurality of pieces of information stored in a memory, each of the plurality of pieces of information being attached with additional information; a retrieval range deciding unit that decides a retrieval range on the basis of the additional information attached to each piece of the information selected by the information selecting unit; and a retrieving unit that retrieves and outputs additional pieces of information of the plurality of pieces of information corresponding to the retrieval range decided by the retrieval range deciding unit from the memory.

The retrieval-direction/retrieval-range deciding unit can operate to change the retrieval direction and the retrieval range and decides the retrieval direction and the retrieval range on the basis of the additional information attached to each piece of information selected by the information selecting unit. The retrieving unit then retrieves and outputs information corresponding to the retrieval direction and the retrieval range decided by the retrieval-direction/retrieval-range deciding unit from the memory. In this way, such an embodiment makes it possible to retrieve information regarding which the retrieval direction and the retrieval range can be easily and freely changed.

According to another embodiment, a method implemented on a display apparatus is provided, including: selecting at least one piece of information from a plurality of pieces of information stored in a memory, each of the plurality of pieces of information being attached with additional information; deciding a retrieval range on the basis of the additional information attached to each piece of the information selected; and retrieving and outputting additional pieces of information of the plurality of pieces of information corresponding to the decided retrieval range from the memory.

According to another embodiment, a computer readable storage medium is provided that is encoded with computer executable instructions, which when executed by a display apparatus, cause the display apparatus to perform a method comprising: selecting at least one piece of information from a plurality of pieces of information stored in a memory, each of the plurality of pieces of information being attached with additional information; deciding a retrieval range on the basis of the additional information attached to each piece of the information selected; and retrieving and outputting additional pieces of information of the plurality of pieces of information corresponding to the decided retrieval range from the memory.

Advantageous Effects

The present embodiments can perform retrieval of information while easily and freely change a retrieval direction and a retrieval range. Accordingly, desired information can be rapidly retrieved and displayed without performance of troublesome repeated operations, such as re-input operations of retrieval values.

BRIEF DESCRIPTION OF THE DRAWINGS

FIG. 2 is a flowchart for describing an operation of the mobile phone serving as the embodiment in a time-related mode of a one-image selection mode.

FIG. 16 is a flowchart for describing an operation of the mobile phone serving as the embodiment in an alteration of the automatic selection mode of the two-image selection mode.

DETAILED DESCRIPTION

The present specification can be applied to mobile phones, for example.

[Configuration of Mobile Phone]

Figure 1:
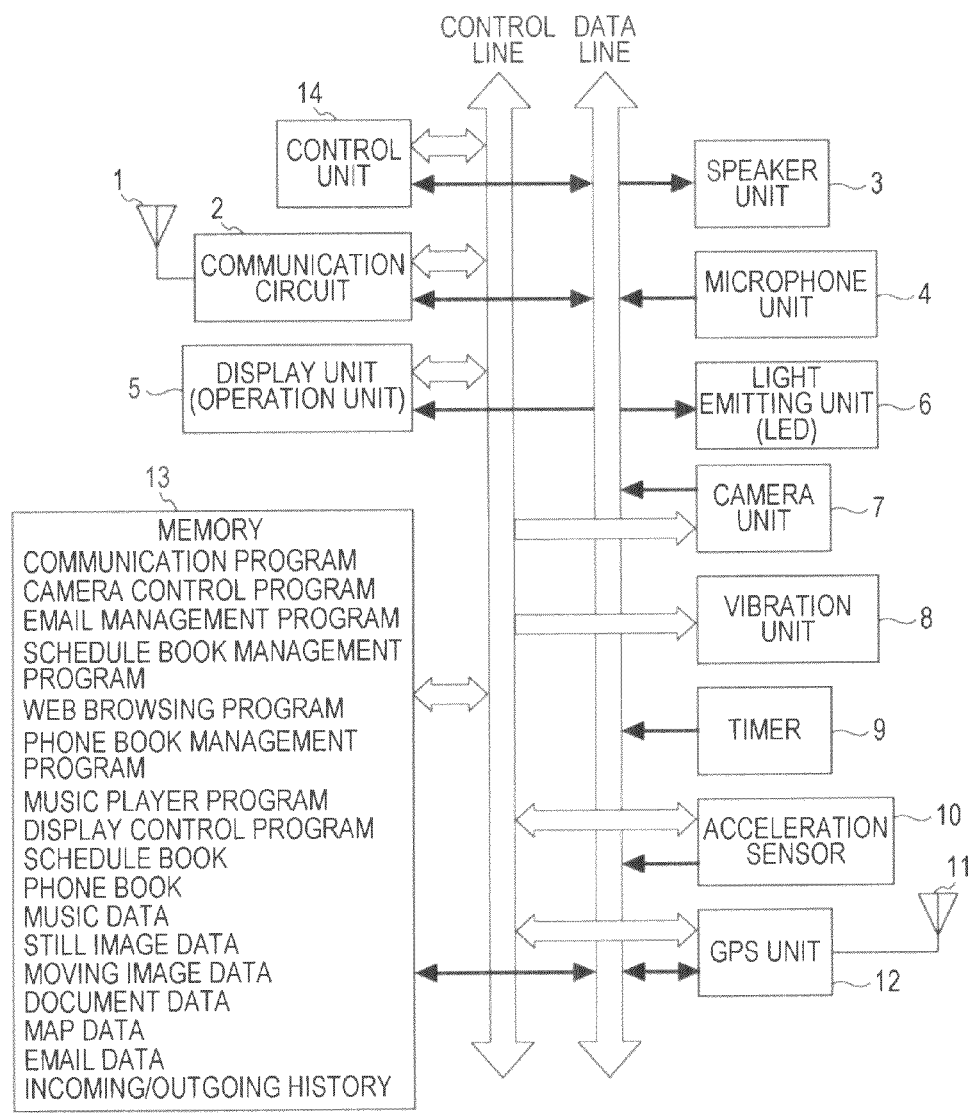
FIG. 1 is a block diagram of a mobile phone serving as an embodiment.
Figure 3A:
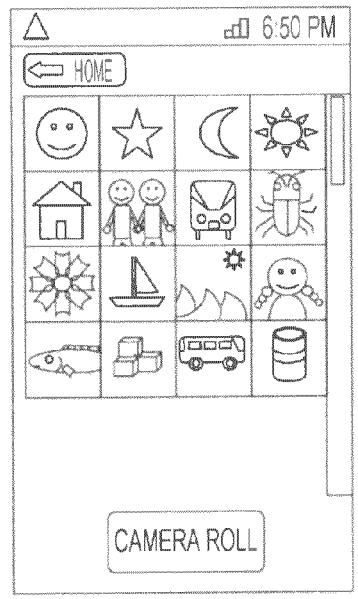
FIG. 3 is a diagram illustrating an example of display screens in the time-related mode.
Figure 3B:
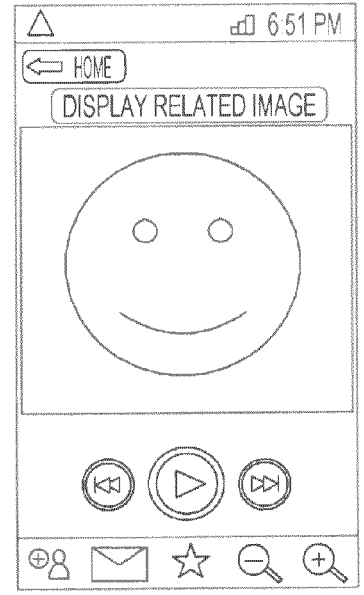
Figure 3C:
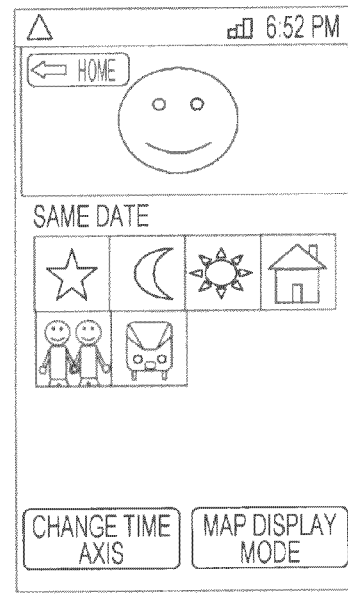
Figure 3D:
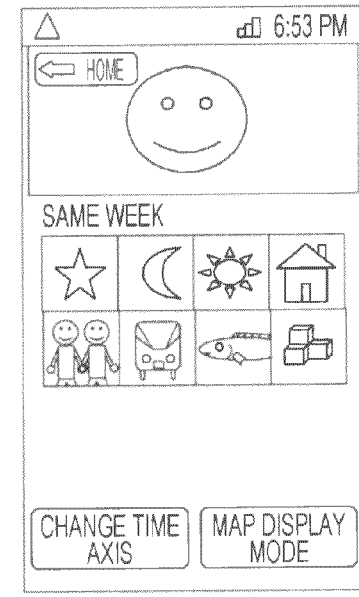

FIG. 1 is a block diagram of a mobile phone serving as an embodiment. As illustrated in this FIG. 1, a mobile phone serving as a first embodiment includes an antenna 1 and a communication circuit 2 that perform wireless communication of voice calls, videophone calls, emails, Web data (Web: World Wide Web), and so on with base stations.

This mobile phone also includes a call-audio speaker unit 3 for acquiring audio output, such as audio of incoming calls, a microphone unit 4 for collecting sound, such as audio of outgoing calls, and a display unit 5, constituted as a so-called touch panel, for performance of a touch operation.

Additionally, this mobile phone includes a light emitting unit 6 (LED: Light Emitting Diode) for informing users of outgoing and incoming calls or the like with light, a camera unit 7 for shooting still images or moving images of a desired subject, a vibration unit 8 for informing users of outgoing and incoming calls or the like by vibrating a casing of the mobile phone, and a timer 9 for counting current time.

This mobile phone also includes an acceleration sensor 10 for detecting a shaking operation applied to the casing of the mobile phone, a GPS antenna (GPS: Global Positioning System) and a GPS unit 12 that detect a current location of the mobile phone and shooting locations of still images and moving images shot by the camera unit.

In addition, this mobile phone includes a memory 13 storing a communication program for performing wireless communication processing through the base stations, various application programs, and various kinds of data or the like handled in these various application programs and a control unit 14 for controlling an operation of the entire mobile phone.

In addition to the communication program, the memory 13 stores a camera control program for performing control of shooting of the camera unit 7. This camera control program has a viewer function for shot still images and moving images.

The memory 13 also stores an email management program for controlling creation, transmission, and reception of emails and a schedule book management program for performing management of a schedule book in which a schedule of a user is registered.

Additionally, the memory 13 stores a web browsing program for performing browsing of web pages or the like by accessing a server apparatus provided in a predetermined network, such as a communication network or the Internet, and performing transmission and reception of information, a phone book management program for performing management of a phone book, and a music player program for performing reproduction of music data.

The memory 13 also stores a display control program for retrieving and displaying data related to a retrieval value specified by a user from various kinds of data, such as still image data, moving image data, music data, and document data.

Meanwhile, the display control program may be stored in advance in the memory 13 in a form of a so-called ROM. Alternatively, the display control program may be downloaded via a predetermined network and stored in the memory 13 or an external memory. Alternatively, a storage medium, such as an external memory, storing the display control program may be mounted in the mobile phone and the control unit 14 of the mobile phone may load the display control program from this storage medium and execute the program.

The memory 13 also includes a schedule book (i.e., a registration area of schedule data) in which a desired schedule of a user is registered and a phone book (i.e., a registration area of personal information of each user) in which user names, still images (face photos or the like), addresses, phone numbers, email addresses, birthdays, and so on of acquaintances and friends of the user are registered.

In addition, the memory 13 stores music data reproduced on the basis of the music player program, still image data and moving image data displayed on the basis of the viewer function of the camera control program and the display control program, predetermined document data, map data on each scale, data of transmitted and received emails, a history of outgoing and incoming phone calls and emails, and so on.

The still image data, the moving image data, the document data, and the music data stored in this memory 13 are attached with additional information, such as shooting date and time information, shooting location information, creation (update) date and time information, creation (update) location information, acquisition date and time information, and acquisition location information.

More specifically, when controlling storage of still image data and moving image data acquired via a network or acquired through an external input terminal of the mobile phone in the memory 13, the control unit 14 also acquires the additional information, such as the shooting date and time information and the shooting location information, attached to these still image data and moving image data and controls storage of the additional information in the memory 13 in association with the corresponding still image data or the corresponding moving image data.

Additionally, when controlling storage of still image data and moving image data shot by the camera unit 7 in the memory 13, the control unit 14 acquires current time information measured by the timer 9 as the shooting date and time information (year, month, day, hour, minute, and second) and also acquires current location information of the mobile phone detected by the GPS unit 12 as the shooting location information. The control unit 14 controls storage of these in the memory 13 in association with the corresponding still image data or the corresponding moving image data.

In addition, when controlling storage of document data acquired via a network or acquired through the external input terminal of the mobile phone in the memory 13, the control unit 14 also acquires the additional information, such as the creation (update) date and time information and creation (update) location information, attached to this document data and controls storage of the additional information in the memory 13 in association with the corresponding document data.

Additionally, when controlling storage of document data created by a user in the mobile phone in the memory 13, the control unit 14 acquires the current time information measured by the timer 9 as the creation (update) date and time information (year, month, day, hour, minute, and second) of this document data and also acquires the current location information of the mobile phone detected by the GPS unit 12 as the creation (update) location information of this document. The control unit 14 controls storage of these in the memory 13 in association with the document data.

Additionally, when controlling storage of music data acquired via a network or acquired through the external input terminal of the mobile phone in the memory 13, the control unit 14 acquires the current time information measured by the timer 9 as the acquisition date and time information (year, month, day, hour, minute, and second) of this music data and also acquires the current location information of the mobile phone detected by the GPS unit 12 as the acquisition location information of this music data. The control unit 14 controls storage of these in the memory 13 in association with the music data.

On the other hand, the display unit 5 constituted as a touch panel displays operation keys, such as numeral keys, an enter key, an on-hook key, and an off-hook key, in addition to operation menus, emails, and images (still images and moving images). The control unit 14 detects an operation key or an operation menu subjected to a touch operation by the user from each of the operation keys and the operation menus displayed on the display unit 5. The control unit 14 then performs control corresponding to this detected operation key, thereby performing display control processing based on the display control program, such as, for example, processing for inputting a phone number and processing for generating a phone call.

[Display Control Processing]

First, the mobile phone according to this embodiment has a "one-image selection mode" for retrieving and displaying data related to one piece of data specified by a user from many pieces of data in a displayed list and a "two-image selection mode" for deciding a retrieval direction and a geographical range subjected to the retrieval on the basis of each piece of additional data attached to two pieces of data specified by a user or a total of two pieces of data, i.e., one piece of data specified by the user and one piece of data automatically selected, and retrieving and displaying data belonging to these retrieval direction and geographical range.

In the one-image selection mode, display in a "time-related mode" for displaying retrieved time-related data as a list of thumbnails and display in a "location-related mode" for displaying retrieved time-related data on a map of a corresponding scale are available.

Regarding each mode, a predetermine mode may be set by default or a user may select and set a desired mode in advance. This mode setting information is stored in the memory 13. When this display control processing is specified from the user, the control unit 14 loads the mode setting information stored in the memory 13 and performs display control processing corresponding to this loaded mode setting information.

An example of retrieving and displaying a list of still images or moving images related to a still image or a moving image specified from a plurality of pieces of still image data and moving image data will be described below as an example.

When causing the mobile phone according to this embodiment to display a list of still images or moving images related to a desired still image or moving image, the user performs an operation to display a general menu on the display unit 5 and performs an operation to select an image-list display menu from this general menu. Upon detecting this operation for selecting the image-list display menu, the control unit 14 loads the mode setting information stored in the memory 13 to recognize a mode set by default or set by the user in advance. The control unit 14 then controls execution of an operation in the recognized mode on the basis of the display control program stored in the memory 13.

[Operation in Time-Related Mode of One-Image Selection Mode]

First, if the time-related mode of the one-image selection mode is specified by the mode setting information, the control unit 14 executes display control processing illustrated in a flowchart of FIG. 2. Upon detecting an operation for selecting a menu for displaying a list of still images or moving images from the general menu by a user, the control unit 14 starts the processing illustrated in the flowchart of this FIG. 2 on the basis of the display control program.

In STEP S1, the control unit 14 forms thumbnail images of still images and moving images stored in the memory 13 and controls displaying of a list of these on the display unit 5 as a list as illustrated in FIG. 3(*a*). The process then proceeds to STEP S2. When forming a thumbnail image of a moving image, the control unit 14 forms a thumbnail image of a still image of one starting frame of the moving image or forms a thumbnail image of a still image of one frame corresponding to a time point that is predetermined time has passed from a start of the moving image and displays the thumbnail image on the display unit 5.

When a user specifies displaying of a still image or a moving image corresponding to a desired thumbnail image from the displayed list of thumbnail images, the user performs a touch operation on an area displaying the thumbnail image of this desired still image or moving image on the display unit 5 with their finger or the like (i.e., an operation for selecting the thumbnail image). In STEP S2, the control unit 14 monitors an operation status of the display unit 5, thereby monitoring presence or absence of this touch operation. If the control unit 14 detects the touch operation, the process proceeds to STEP S3. If the control unit 14 does not detect the touch operation, the process proceeds to STEP S10.

Meanwhile, a "Home button" for suspending the one-image selection mode and returning the display screen back to a standby screen is provided in this list display screen. If the process proceeds to STEP S10 because the touch operation is not detected, the control unit 14 determines whether the "Home button" is operated in STEP S10, thereby determining whether the operation for returning the display screen of the display unit 5 back to the standby screen is performed. Upon detecting this operation for returning the display screen back to the standby screen, the control unit 14 suspends execution of this single selection display mode and returns the display screen of the display unit 5 back to the standby screen. If the control unit 14 does not detects this operation for returning the display screen back to the standby screen, the process returns to STEP S2.

If the process proceeds to STEP S3 after the operation for selecting the thumbnail image is detected in STEP S2, the control unit 14 then reads out a still image or a moving image corresponding to this selected thumbnail image from the memory 13 and controls displaying of the image on the display unit 5. FIG. 3(*b*) is an example for displaying a moving image corresponding to the thumbnail image selected by the user on the display unit 5. When a moving image is displayed as illustrated in this FIG. 3(*b*), the control unit 14 controls displaying of a play/pause button, a fast-forward playback button, a fast-rewind playback button on the display unit 5. The control unit 14 then performs control of playback of the moving image in accordance with an operation on the buttons by the user.

When displaying the moving image or the still image corresponding to the thumbnail image selected by the user, the control unit 14 also displays a "related-image display specification button" for specifying displaying of moving images or still images related to this displayed moving image or still image on the display unit 5 as illustrated in FIG. 3(*b*).

When the user specifies displaying of still images or moving images related to the still image or the moving image selected from the list of thumbnail images illustrated in FIG. 3(*a*), the user performs a touch operation on the "related-image display specification button" illustrated in FIG. 3(*b*).

In STEP S4, the control unit 14 monitors the operation status of the display unit 5, thereby monitoring presence or absence of a touch operation on this related-image display specification button. Once the control unit 14 detects the touch operation on the related-image display specification button, the process proceeds to STEP S5.

In STEP S5, the control unit 14 displays the still image or the moving image that is selected by the user and displayed in STEP S3 (i.e., the currently displayed image) in close-up at an upper area of the display unit 5 as an "association base image". The control unit 14 also reads out shooting date and time information attached to this association base image from the memory 13 to recognize the shooting date and time of this association base image. The control unit 14 then retrieves still images and moving images shot on the same date as the association base image from the memory 13 as related images related to the association base image with reference to shooting date and time information attached to each of still images and moving images stored in the memory 13, forms a thumbnail image of each of the retrieved related images, and displays a list on the display unit 5.

FIG. 3(*c*) is a display example of the association base image and the thumbnail images of the respective related images shot on the same date as this association base image. This example indicates an example in which the control unit 14 displays the association base image at the upper area of the display unit 5 and displays a list of thumbnail images of the respective related images, i.e., the still images and moving images, shot on the same date as the association base image at rest of the area of the display unit 5. The user can recognize the still images and the moving images shot on the same date as the still image or the moving image selected by themselves by looking this list of thumbnail images.

After performing displaying of such a list of thumbnail images, the control unit 14 monitors presence or absence of an operation for changing the mode to a map display mode, to be described later, presence or absence of an operation for selecting a thumbnail image displayed as the list in STEP S5, presence or absence of an operation for changing a time axis for use in retrieval, and presence or absence of an operation for terminating display in STEP S6, STEP S7, STEP S8, and STEP S9, respectively.

More specifically, after performing displaying of the list of thumbnail images in STEP S5, the control unit 14 displays a "time-axis changing button" for specifying changing of the time axis for use in retrieval of images and a "map-display-mode changing button" for specifying changing of the mode to the map display mode to be described later at a lower area of the display unit 5 as illustrated in FIG. 3(*c*).

Figure 5:
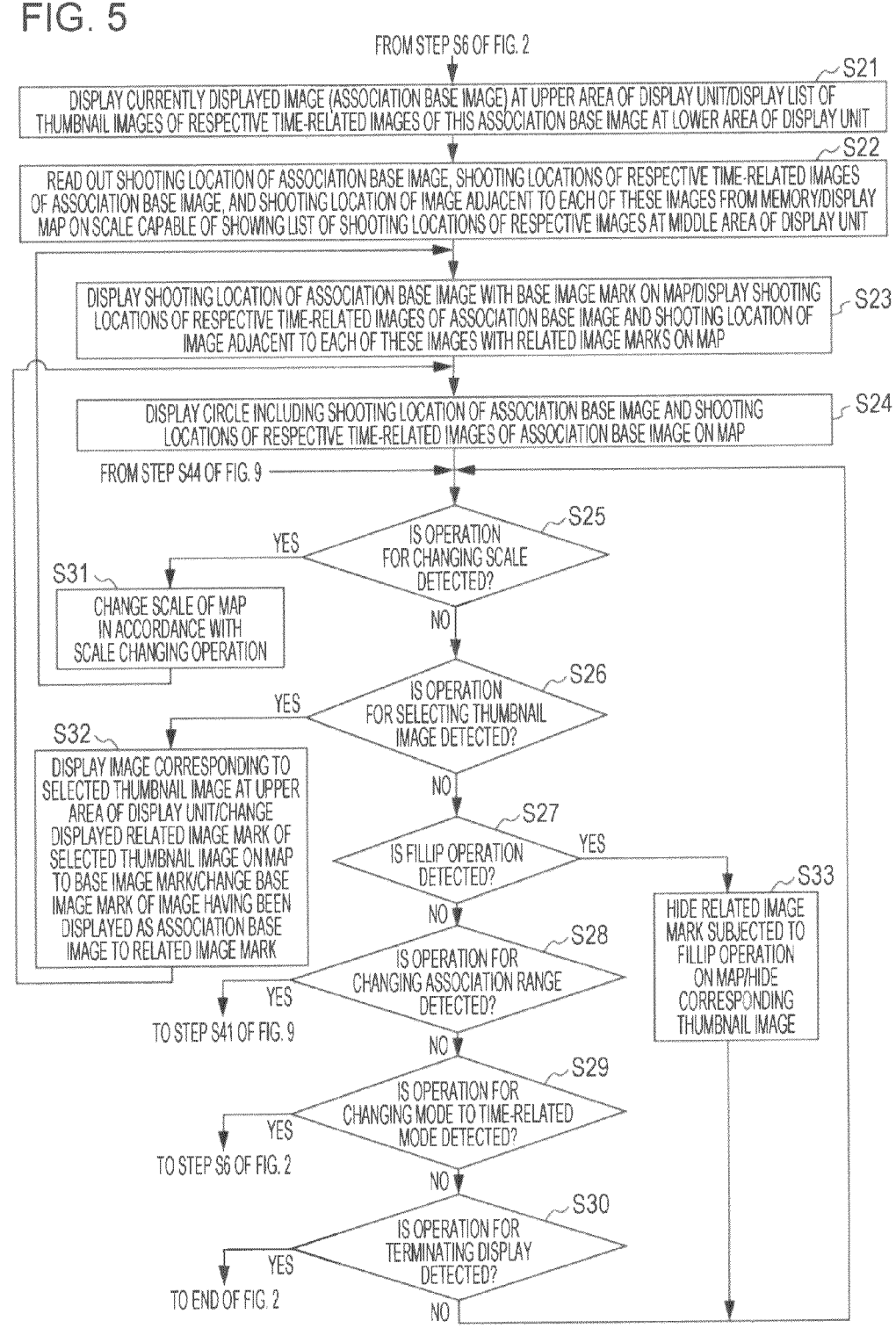
FIG. 5 is a flowchart for describing an operation of the mobile phone serving as the embodiment in a map display mode of the one-image selection mode.

If the control unit 14 detects a touch operation on the "map-display-mode changing button" in STEP S6, the process proceeds to STEP S21 of a flowchart of FIG. 5 and the control unit 14 controls execution of the map display mode for displaying a shooting location of the association base image and a shooting location of each related image on a map of a corresponding scale. Details will be described later.

When the user wants to display, in the time-related mode of this one-image selection mode, an image corresponding to a desired thumbnail image out of the thumbnail images displayed as the list in STEP S5, the user performs a touch operation on a display area of the display unit 5 corresponding to the desired thumbnail image out of the thumbnail images displayed as the list in STEP S5. If the control unit 14 detects this touch operation in STEP S7, the process returns to STEP S3 and the control unit 14 reads out a still image or a moving image corresponding to the thumbnail image selected (i.e., the touch operation) by the user and controls displaying of this image in close-up on the display unit 5 as illustrated in FIG. 3(*b*).

The operation for selecting the desired thumbnail image from the thumbnail images displayed as the list in STEP S5 is performed in this way, whereby the image subjected to this selection operation is displayed in close-up on the display unit 5 as the association base image. When a touch operation is performed on the "related-image display specification button" illustrated in FIG. 3(*b*) in this state, the control unit 14 retrieves still images and moving images shot on the same date as the association base image (in this case, the image selected on the basis of the thumbnail image displayed as the list in STEP S5) from the memory 13, forms a thumbnail image of a related image, i.e., each of the retrieved still images and moving images, and displays a list on the display unit 5 (i.e., STEP S5) as described above.

In one example, when the control unit 14 displays a list of thumbnail images of related images time-related to the association base image in the mobile phone according to this embodiment next, the control unit 14 first retrieves a thumbnail image of each related image shot on the same date as the currently displayed image from the memory 13 and displays the list. Every time the user performs a touch operation on the "time-axis changing button" thereafter, the control unit 14 sequentially changes the time axis, such as related images shot on the same week as the association base image→related images shot in the same month as the association base image→related images shot in the same year as the association base image→related images shot in the same season as the association base image→related images shot on the same date as the association base image, and so on, to retrieve the related images time-related to the association base image and displays a list of thumbnail images thereof on the display unit 5.

Accordingly, the control unit 14 monitors presence or absence of the touch operation on the "time-axis changing button" in STEP S8. Every time the control unit 14 detects the touch operation, the control unit 14 changes the time axis for use in retrieval in an order of "date", "week", "month", "year", "season", "date", and so on, retrieves images time-related to the currently displayed image, and displays a list of thumbnail images thereof on the display unit 5 in STEP S11.

When the user performs the touch operation on the "time-axis changing button" with a list of thumbnail images of still images and moving images shot on the same date as the association base image being displayed in this way as illustrated in FIG. 3(*c*), a list of thumbnail images of respective related images shot on the same week as the association base image is displayed as illustrated in FIG. 3(*d*). If the user performs the touch operation on the "time-axis changing button" in this state, a list of thumbnail images of respective related images shot in the same month as the association base image is displayed as illustrated in FIG. 4(*a*).

Figure 4A:
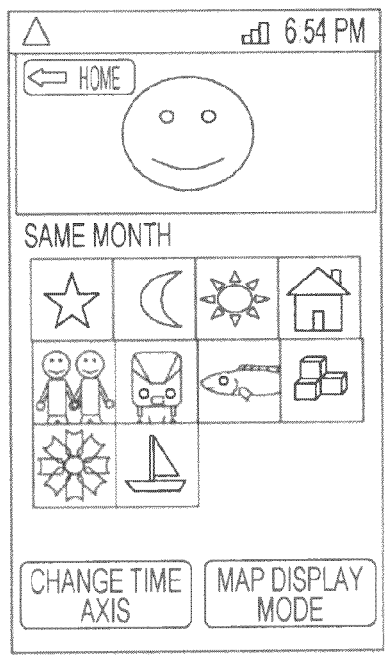
FIG. 4 is a diagram illustrating another example of display screens in the time-related mode.
Figure 4B:
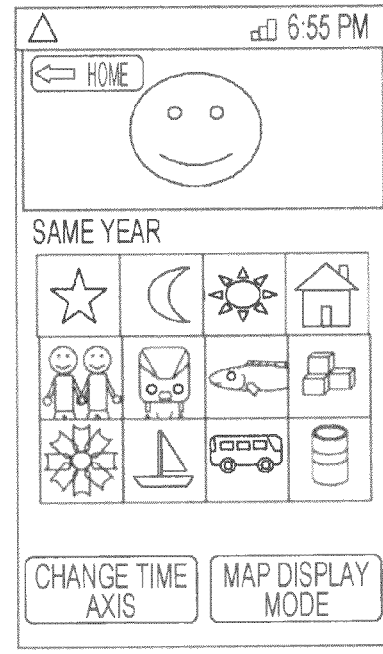
Figure 4C:
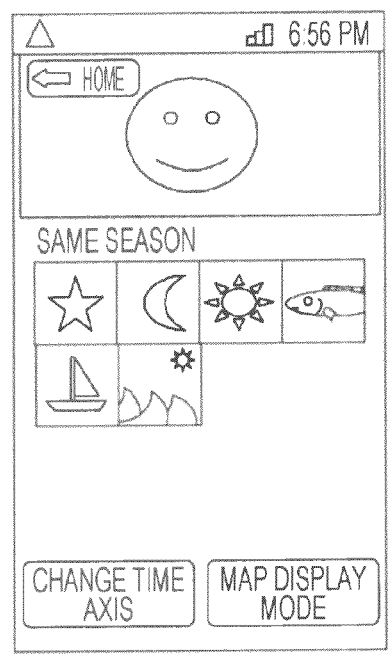

Additionally, if the user performs the touch operation on the "time-axis changing button" with the list of thumbnail images of the respective related images shot in the same month as the association base image being displayed as illustrated in FIG. 4(*a*), a list of thumbnail images of respective related images shot in the same year as the association base image is displayed as illustrated in FIG. 4(*b*). If the user performs the touch operation on the "time-axis changing button" in this state, a list of thumbnail images of respective related images shot in the same season as the association base image is displayed as illustrated in FIG. 4(*c*).

In addition, if the user performs the touch operation on the "time-axis changing button" with the list of thumbnail images of the respective related images shot in the same season as the association base image being displayed as illustrated in FIG. 4(*c*), the control unit 14 displays a list of thumbnail images of respective related images shot on the same date as the association base image as illustrated in FIG. 3(*c*).

The control unit 14 repeatedly controls execution of time-axis-based display control of related images in such a time-related mode of the one-image selection mode until the control unit 14 detects a display termination operation (i.e., a touch operation on the Home button) of the user in STEP S9.

[Operation in Map Display Mode of One-Image Selection Mode]

If the control unit 14 detects a touch operation on the map-display-mode changing button illustrated in FIG. 3(*c*), FIG. 3(*d*), FIG. 4(*a*) to FIG. 4(*c*) in STEP S6 of the flowchart of FIG. 2 in such a one-image selection mode, the control unit 14 shifts into the "map display mode" for displaying images having time information related to that of the currently displayed image on a map on a corresponding scale and starts processing corresponding to this map display mode from STEP S21 of the flowchart of FIG. 5 next.

In STEP S21, the control unit 14 displays the image having been displayed at the upper area of the display unit 5 immediately before detecting the touch operation on the map-display-mode changing button (i.e., the currently displayed image) at the upper area of the display unit 5 as the "association base image" as illustrated in FIG. 6(*a*). The control unit 14 also displays a list of thumbnail images of respective images time-related to this association base image at the lower area of the display unit 5. The process then proceeds to STEP S22.

In STEP S22, the control unit 14 next reads out the shooting location information attached to the association base image, the shooting location information attached to each of the time-related images of the association base image, and the shooting location information of images having shooting locations close to each of these images from the memory 13. The control unit 14 reads out map data on a scale capable of collectively displaying the shooting locations of the respective images on the basis of the shooting location information of these images from the memory 13 and controls displaying of a map corresponding to this map data at the middle area of the display unit 5 as illustrated in FIG. 6(*a*). The process then proceeds to STEP S23.

Figure 6A:
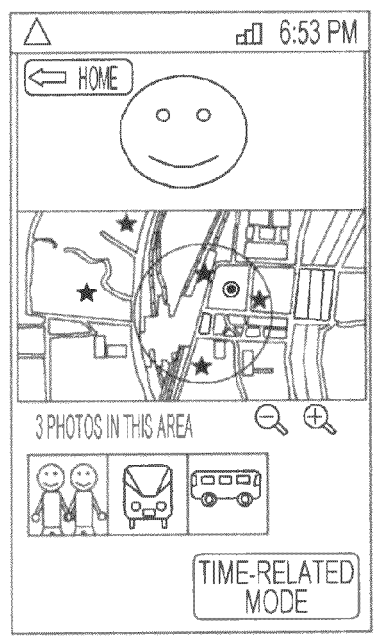
FIG. 6 is a diagram illustrating an example of display screens in the map display mode.

In STEP S23, as illustrated in FIG. 6(a), the control unit 14 then displays the shooting location of the association base image with a base image mark, e.g., a double circle, on the map and displays the shooting location of each of the time-related images of the association base image and the shooting location of the image close to that of each of these images with a related image mark, e.g., a star, on the map. The process then proceeds to STEP S24.

Next, in STEP S24, the control unit 14 then displays a circular image including the shooting location of the association base image and the shooting location of each of the time-related images of the association base image on the map. The process then proceeds to STEP S25.

As described above, the association base image selected by the user in STEP S2 of the flowchart of FIG. 2 is displayed at the upper area of the display unit 5, whereas the list of thumbnail images of the respective time-related images of this association base image is displayed at the lower area of the display unit 5.

Accordingly, displaying the circle including the shooting location of the association base image and the shooting location of each of the time-related images of the association base image on the map displayed at the middle area of the display unit 5 allows the user to visually confirm the shooting location of each image currently displayed on the display unit 5 at a glance.

In addition to the shooting location of the association base image and the shooting location of each time-related image of the association base image, the shooting location of the image close to that of each of these images (i.e., shooting locations outside the circle in FIG. 6(a)) is also displayed. Accordingly, it is possible to allow the user to recognize presence of images that are slightly time-related but is geographically related to the association base image in a geographical range of the currently displayed map by allowing the user to look the related image marks of a star displayed outside this circle.

The control unit 14 then displays each of a scale enlarging button, i.e., a sign "+", and a scale reducing button, i.e., a sign "−", at around a lower right area of the map image in this map display mode. If the user performs a touch operation on the scale enlarging button of the sign "+", the control unit 14 gradually reads out map information on a larger scale from the memory 13 in accordance with a duration of this touch operation and displays this on the display unit 5. In this way, by performing the touch operation on the scale enlarging button of the sign "+", a map on a larger scale (i.e., a map in which a narrow alley and a narrow land are enlarged: a map of a narrower display range) is gradually displayed on the display unit 5.

In contrast, if the user performs a touch operation on the scale reducing button of the sign "−", the control unit 14 gradually reads out map information of a smaller scale from the memory 13 in accordance with a duration of this touch operation and displays this on the display unit 5. In this way, by performing the touch operation on the scale reducing button of the sign "−", a map on a smaller scale (i.e., a map of a wider display range) is gradually displayed on the display unit 5.

Additionally, in the mobile phone according to this embodiment, the user can perform operations for enlarging and reducing the map by performing a touch operation on the display unit 5 constituted as a so-called touch panel. In one example, if the user touches the middle area of the display unit 5 displaying the map with their abutting thumb and forefinger and performs an operation for gradually increasing a distance between the abutting thumb and forefinger (an enlargement specifying operation) in this state, the control unit 14 gradually reads out map information of a larger scale from the memory 13 in accordance with this enlargement specifying operation and displays this on the display unit 5. In this way, a map on a larger scale (i.e., a map in which a narrow alley and a narrow land are enlarged) is gradually displayed on the display unit 5 in accordance with the enlargement specifying operation.

Additionally, if the user touches the middle area of the display unit 5 displaying the map with their thumb and forefinger separated from each other at a distance of 3-5 centimeters, for example, and performs an operation for gradually decreasing the distance between the thumb and the forefinger (a reduction specifying operation) in this state, the control unit 14 gradually reads out the map information of a smaller scale from the memory 13 in accordance with this reduction specifying operation and displays this on the display unit 5. In this way, a map on a smaller scale (i.e., a map in which a narrow alley and a narrow land are enlarged: a map of a narrower display range) is gradually displayed on the display unit 5 in accordance with the reduction specifying operation.

In STEP S25 of the flowchart of FIG. 5, the control unit 14 monitors presence or absence of an operation for changing the scale of the currently displayed map by the touch operation on such a scale enlarging button or a scale reducing button, the enlargement specifying operation, or the reduction specifying operation. If the control unit 14 detects such an operation for changing the scale of the map, the process proceeds to STEP S31. As described above, the control unit 14 reads out the map information on the scale corresponding to the scale changing operation from the memory 13 and displays it at the middle area of the display unit 5. The process then returns to STEP S23.

When the control unit 14 reads out the map on the scale corresponding to the scale changing operation from the memory 13, the control unit 14 reads out the map information on the scale corresponding to the scale changing operation based on the shooting location of the association base image and displays it at the middle area of the display unit 5. That is, the control unit 14 reads out the map information of a range including the shooting location of the association base image on the scale corresponding to the scale changing operation from the memory 13 and displays it at the middle area of the display unit 5.

After the control unit 14 reads out the map information on the scale corresponding to the scale changing operation from the memory 13 and displays it at the middle area of the display unit 5 in this way, the control unit 14 displays the shooting location of the association base image with the base image mark of, for example, a double circle on the map and displays the shooting location of each image time-related to the association base image and the shooting location of the image close to that of each of these images with the related image mark of, for example, a star, on the map in STEP S23. The process then proceeds to STEP S24.

In STEP S24, the control unit 14 then displays a circular image including the shooting location of the association base image and the shooting location of each of the time-related images of the association base image on the map. The process then proceeds to STEP S25.

Figure 6B:
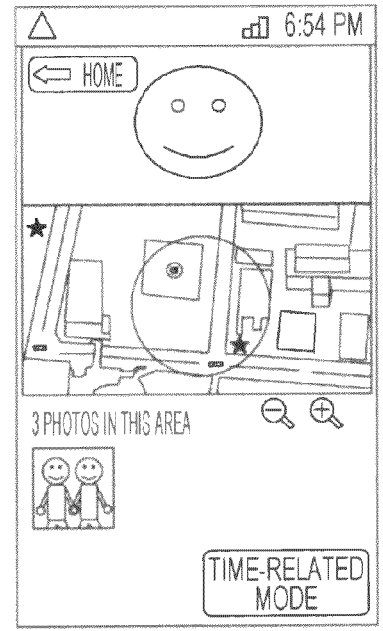

FIG. 6(b) is a display example when a scale changing operation for enlarging the scale of the displayed map is performed. As illustrated in this FIG. 6(b), if the scale changing operation for enlarging the scale of the map is performed, the control unit 14 displays a map on a larger scale at the middle area of the display unit 5. The control unit 14 also displays the shooting location of the association base image with the base image mark of a double circle and displays the shooting location of each time-related image of the association base image and the shooting location of the image close to that of each of these images with the related image mark of a star on this map.

Figure 6C:
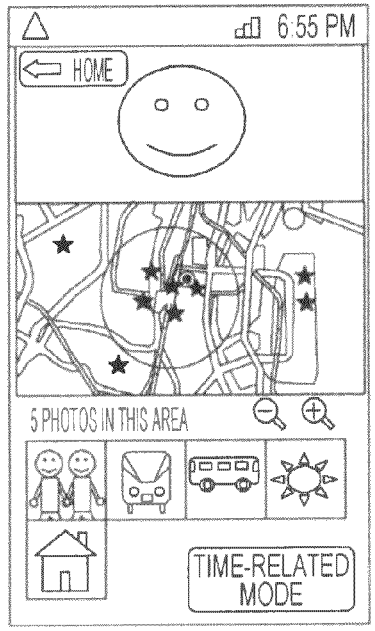

In addition, FIG. 6(c) is a display example when a scale changing operation for reducing the scale of the displayed map is performed. As illustrated in this FIG. 6(c), if the scale changing operation for reducing the scale of the map is performed, the control unit 14 displays a map on a smaller scale at the middle area of the display unit 5. The control unit 14 also displays the shooting location of the association base image with the base image mark of a double circle and displays the shooting location of each time-related image of the association base image and the shooting location of the image close to that of each of these images with the related image mark of a star on this map.

By setting the scale of the displayed map to be changeable in this manner, the user can accurately recognize the shooting location of the association base image or the like when the scale of the displayed map is enlarged. Additionally, when the scale of the displayed map is reduced, the user can recognize presence of each image having a shooting location near the shooting location of the association base image in addition to the shooting location of the association base image.

When the user wants to display an image corresponding to a desired thumbnail image from the list of thumbnail images displayed at the lower area of the display unit 5 (i.e., images having shooting locations within the range of the circle on the map) as illustrated in FIG. 6(a) to FIG. 6(c), the user next performs a touch operation on a display area of the display unit 5 corresponding to the desired thumbnail image.

In STEP S26 of the flowchart of FIG. 5, the control unit 14 monitors presence or absence of this touch operation on the display area of the display unit 5 corresponding to the thumbnail image. If the control unit 14 detects this touch operation, the process proceeds to STEP S32 and the control unit 14 displays an image corresponding to the thumbnail image selected through the touch operation at the upper area of the display unit 5. The control unit 14 also changes the related image mark of the selected thumbnail image displayed on the map to the base image mark and changes the base image mark of the image having been displayed as the association base image to the related image mark.

Figure 6D:
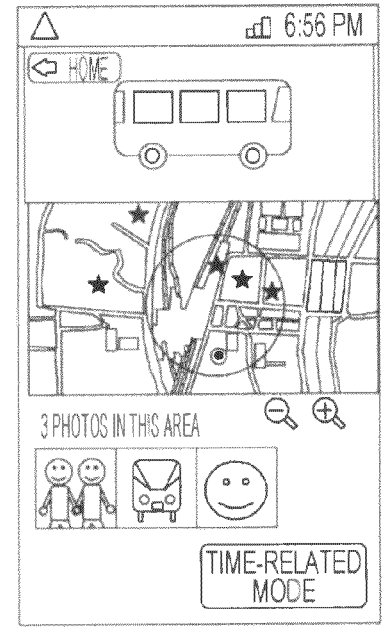

More specifically, for example, when the user performs a touch operation on a thumbnail image at a right end, i.e., a thumbnail image of an image of a bus, out of three thumbnail images displayed at the lower area of the display unit 5 in the display example of FIG. 6(a), the control unit 14 reads out the image corresponding to this thumbnail image of the image of the bus from the memory 13 and displays this at the upper area of the display unit 5 in close-up as illustrated in FIG. 6(d).

Additionally, the control unit 14 sets this image of the bus as the association base image. As illustrated in FIG. 6(d), the control unit 14 changes the mark indicating a shooting location of this image of the bus on the map from the related image mark to the base image mark and also changes the mark of the image having been set as the association base image on the map from the base image mark to the related image mark.

In this way, since the image corresponding to the selected thumbnail image is displayed in close-up every time the thumbnail-image selecting operation is performed, the user can accurately recognize the image corresponding to the selected thumbnail image with a large image. In addition, since the shooting location of the selected thumbnail image is displayed with the base image mark on the map, the user can accurately recognize the shooting location of the selected thumbnail image.

When the user wants to hide the related image mark of an unnecessary shooting location out of the related image marks on the map displayed at the middle area of the display unit 5 as illustrated in FIG. 6(a), the user next performs an operation for filliping this unnecessary related image mark (a fillip operation).

In STEP S27 of the flowchart of FIG. 5, the control unit 14 monitors presence or absence of this fillip operation. If the control unit 14 detects the fillip operation, the process proceeds to STEP S33. The control unit 14 hides the related image mark subjected to the fillip operation on the map and hides the corresponding thumbnail image.

Figure 7A:
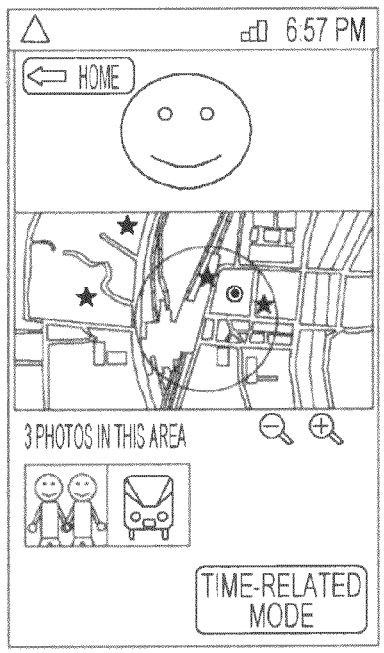
FIG. 7 is a diagram for describing an operation for changing an association range in the map display mode.

More specifically, when the user performs the fillip operation on the related image mark at the lowest part inside the circle on the map in the display example illustrated in FIG. 6(a), for example, the control unit 14 hides the related image mark subjected to this fillip operation on the map and hides the thumbnail image (the thumbnail image of the image of the bus in this example case) corresponding to the related image mark subjected to the fillip operation as illustrated in FIG. 7(a).

When many related image marks are displayed on the map or the like, for example, the user can easily organize the related image marks displayed on the map and the thumbnail images in the displayed list by simply performing an operation for filliping the related image mark seemed to be unnecessary with their finger (the fillip operation).

Meanwhile, when the fillip operation is performed on the unnecessary related image mark on the map, the related image mark subjected to this fillip operation is hidden on the map and the thumbnail image corresponding to the related image mark subjected to the fillip operation is also hidden in this example. However, this may be configured so that, when the fillip operation is performed on an unnecessary thumbnail image from each thumbnail image displayed as the list, the thumbnail image subjected to this fillip operation is hidden and a related image mark corresponding to the thumbnail image subjected to the fillip operation is also hidden on the map.

Additionally, although the fillip operation can be performed only on the related image mark, this may be configured so that the fillip operation can be also performed on the base image mark. When the fillip operation is performed on the base image mark, the control unit 14 newly changes the displayed related image mark, out of the related image marks inside the circle on the map, that is the nearest to the base image mark subjected to the fillip operation to the base image mark. The control unit 14 also reads out an image corresponding to this new base image mark from the memory and displays the image at the upper area of the display unit 5.

Next, in the mobile phone according to this embodiment, a range of retrieval (i.e., a range of association) can be freely changed by performing an operation for enlarging or reducing the circular image on the map (an association-range changing operation) in this map display mode. The control unit 14 monitors presence or absence of this association-range changing operation in STEP S28. If the control unit 14 detects the association-range changing operation, the process proceeds to STEP S41 of FIG. 8. Details will be described later.

The control unit 14 then displays a "time-related-mode changing button" for returning from the map display mode to the above-described time-related mode at around a lower end area of the display unit 5 in this map display mode as illustrated in FIG. 6(a) to FIG. 6(d). When the user returns the mode from the map display mode to the time-related mode, the user performs a touch operation on this "time-related-mode changing button".

In STEP S29 of the flowchart of FIG. 5, the control unit 14 monitors presence or absence of the touch operation on this "time-related-mode changing button". If the control unit 14 detects the touch operation on the "time-related-mode changing button", the process returns to STEP S6 of the flowchart of FIG. 2. The control unit 14 controls execution of the above-described time-related mode.

The control unit 14 repeatedly controls execution of display control of related images based on the shooting location of each image in such a map display mode of the one-image selection mode until the control unit 14 detects a display termination operation (i.e., a touch operation on the Home button) of the user in STEP S30.

Meanwhile, in this example, the shooting location of the association base image is displayed with a mark of a double circle (the base image mark) on the map and the shooting location of the time-related image of the association base image and the related image geographically related to the association base image are displayed with the star mark (the related image mark) on the map in the map display mode. However, thumbnail images may be displayed on the map instead of these base image mark and related image mark.

[Operation for Changing Association Range]

Next, in the mobile phone according to the embodiment, the user can freely change the association range indicated by the circular image by performing an operation for expanding, shrinking, and deforming the circular image on the map in such a map display mode.

Figure 7B:
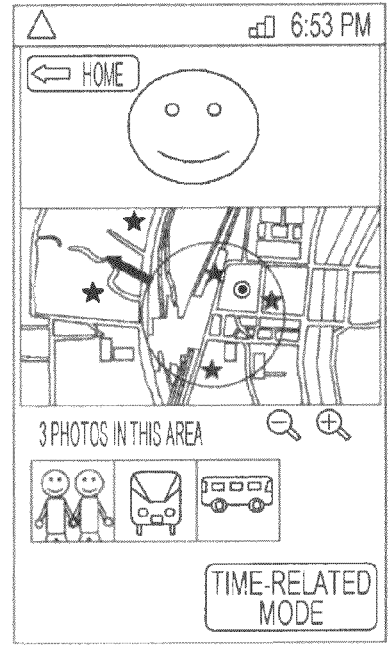
Figure 7C:
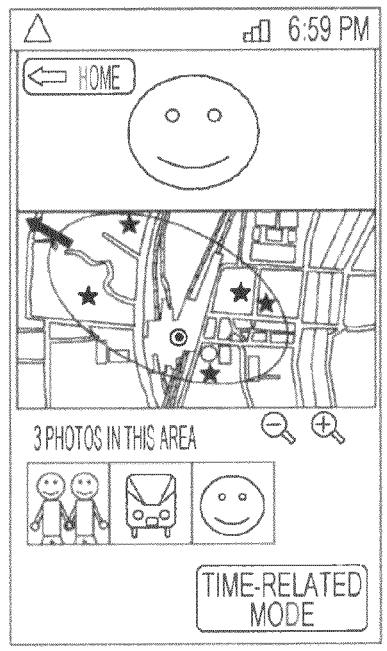

More specifically, when the user changes the association range, the user performs a touch operation on one point of a perimeter part of the circle displayed on the map with their finger and slides the touching finger toward outside of the circle along a desired direction in this state (an one-point expanding operation) as indicated by an allow in FIG. 7(b). If this expanding operation is performed, the control unit 14 expands the circular image displayed on the map in accordance with the expanding operation as illustrated in FIG. 7(c). In this way, the association range that has been a perfect circle is changed to an oval association range extending in the direction of the expanding operation of the user.

Figure 7D:
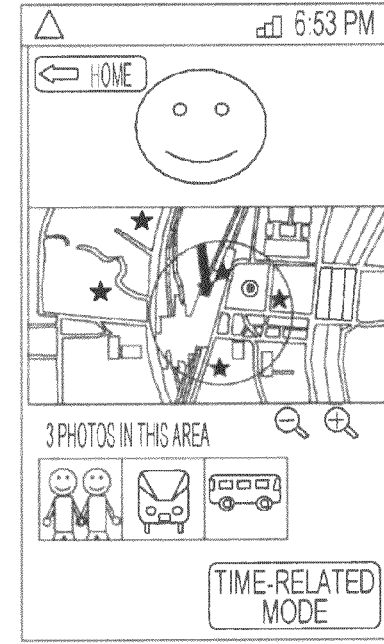
Figure 8A:
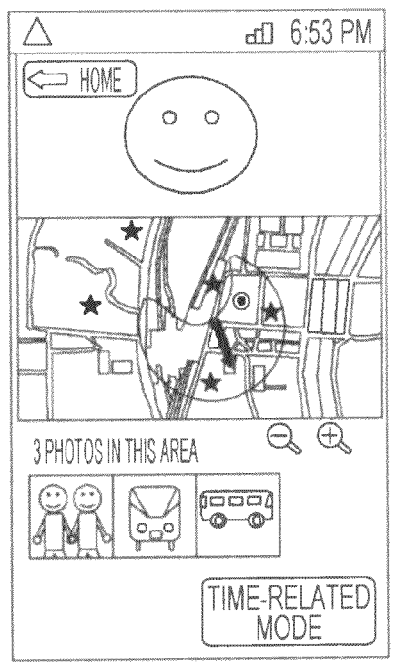
FIG. 8 is another diagram for describing the operation for changing the association range in the map display mode.

Similarly, as indicated by an allow in FIG. 7(d), the user performs a touch operation on one point of the perimeter part of the circle displayed on the map with their finger and slides the touching finger toward inside of the circle along a desired direction in this state (a shrinking operation). If this shrinking operation is performed, the control unit 14 shrinks the circular image displayed on the map in accordance with the shrinking operation as illustrated in FIG. 8(a). In this way, the association range that has been a perfect circle is changed to an association range in a shape denting in each direction of the shrinking operation of the user.

Figure 8B:
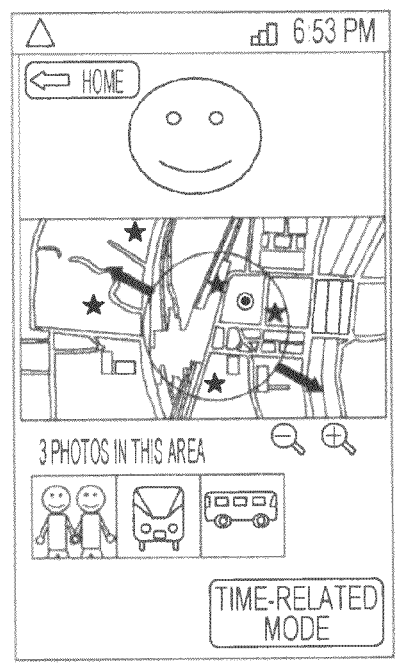
Figure 8C:
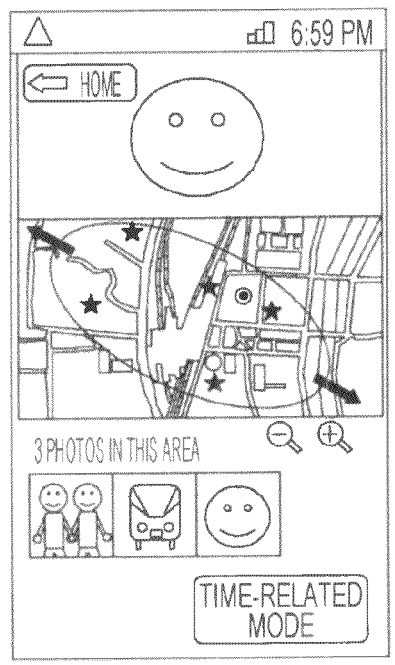

Similarly, as indicated by an arrow in FIG. 8(b), the user performs a touch operation on two points of the perimeter part of the circle displayed on the map with their two fingers and slides the two touching fingers toward outside of the circle along a desired direction in this state (a two-point expanding operation). If this expanding operation is performed, the control unit 14 expands the circular image displayed on the map in accordance with the expanding operation as illustrated in FIG. 8(c). In this way, the association range that has been a perfect circle is changed to an oval association range extending in the direction of the expanding operation of the user.

Figure 8D:
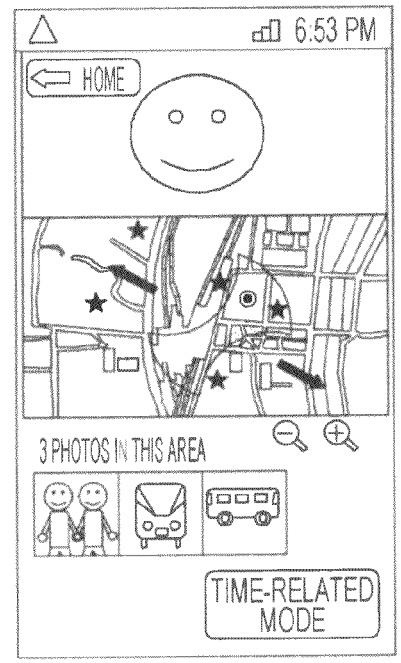

Similarly, the user performs a touch operation on two points of the perimeter part of the circle displayed on the map with their two fingers and slides the two touching fingers toward inside of the circle along a desired direction in this state (a two-point shrinking operation). If this shrinking operation is performed, the control unit 14 shrinks the circular image displayed on the map in accordance with the shrinking operation as illustrated in FIG. 8(d). In this way, the association range that has been a perfect circle is changed to an association range in a shape denting in each direction of the shrinking operation of the user.

In STEP S28 of the flowchart of FIG. 5, the control unit 14 monitors presence or absence of such an association-range changing operation by the user. If the control unit 14 detects the association-range changing operation, the process proceeds to STEP S41 of FIG. 9.

In STEP S41, the control unit 14 expands, shrinks, and deforms the circular image displayed on the map in accordance with the association-range changing operation by the user. The control unit 14 also reads out a map on a scale corresponding to the association changing operation from the memory 13 and displays this at the middle area of the display unit 5. The process then proceeds to STEP S42. In this way, the scale of the map displayed on the display unit 5 is changed in accordance with the association changing operation.

In STEP S42, the control unit 14 detects related images having shooting locations included in the displayed map on the scale from the memory 13. The control unit 14 then displays the shooting location of each detected related image with the above-described related image mark of a star mark on the map. The process then proceeds to STEP S43.

In STEP S43, the control unit 14 forms thumbnail images of the respective related images corresponding to the related image marks displayed inside the circle on the map and displays these at the lower area of the display unit. The process then proceeds to STEP S44.

In STEP S44, the control unit 14 determines whether the above-described association-range changing operation is continued by the user. If the control unit 14 determines that the association-range changing operation is continued, the control unit 14 repeatedly executes the above-described processing of STEP S41 to STEP S43. If the control unit 14 determines that the association-range changing operation is terminated, the process returns to STEP S25 of the flowchart of FIG. 5.

Figure 10:
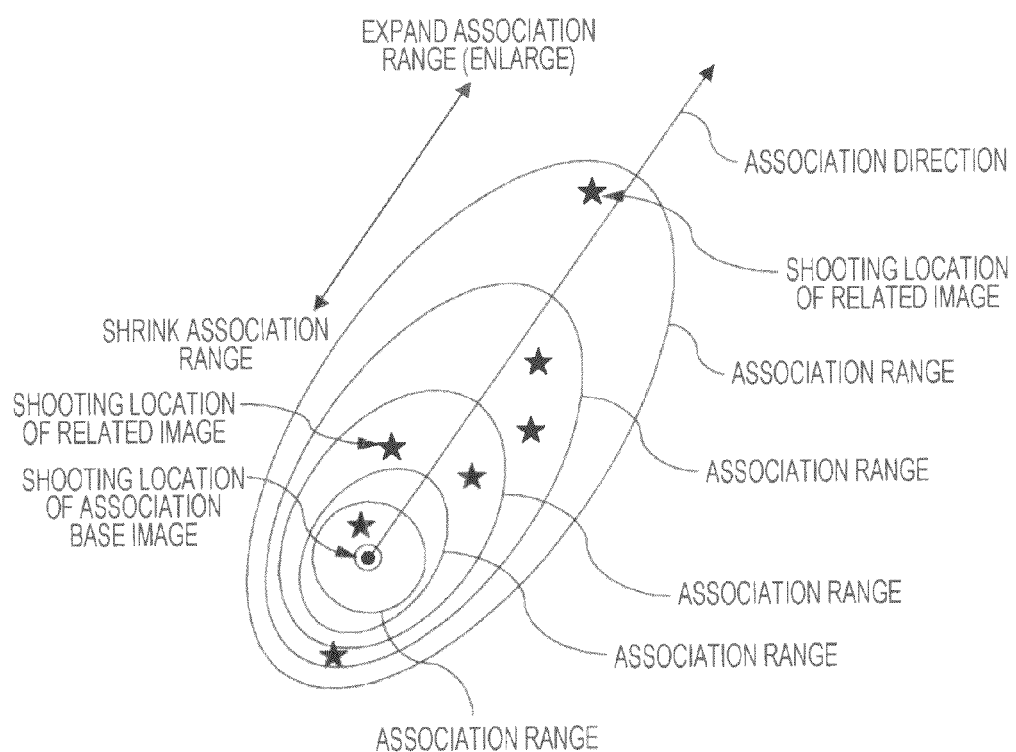
FIG. 10 is a diagram conceptually illustrating the operation for changing the association range in the map display mode.

FIG. 10 is a conceptual diagram of such an association-range changing operation. As illustrated in this FIG. 10, this association-range changing operation is an operation for setting a circle including the association base image as an association range serving as a criterion, expanding or shrinking this criterion association range in a direction corresponding to the association changing operation of the user, detecting related images having shooting locations within the range indicated by this expanded or shrunk circle, and displaying the related images on the map.

Accordingly, if the user performs an expanding or shrinking operation of the circle in a desired direction on the map, the control unit 14 detects related images included in a geographical range indicated by the circle subjected to this expanding or shrinking operation and displays a list of thumbnail images of these related images on the display unit 5.

The mobile phone according to this embodiment allows the user to perform an operation for freely changing the association range by performing the expanding operation or the shrinking operation on the circle displayed on the map in the desired direction in this way. Accordingly, the user can easily and freely change the retrieval range (i.e., the association range) in realtime while viewing a retrieval result and can retrieve the desired image. Thus, the user can rapidly retrieve and display a desired image without repeatedly performing a troublesome operation, such as a re-input operation of a retrieval value.

[Operation in Two-Image Selection Mode]

The "two-image selection mode" for deciding a retrieval direction and a geographical range of the retrieval on the basis of pieces of shooting location information attached to respective images corresponding to two thumbnail images and for displaying a list of thumbnail images of images belonging to these retrieval direction and geographic range will now be described.

In the mobile phone according to the embodiment, display in a "manual selection mode" for retrieving images belonging to the retrieval direction and the geographical range corresponding to two thumbnail images specified by the user and displaying a list of thumbnail images thereof and display in a "two-image selection mode" for retrieving images belong to the retrieval direction and the geographical range corresponding to a total of two thumbnail images, i.e., one thumbnail image specified by the user and one thumbnail image automatically selected, and displaying a list of thumbnail images thereof are available in this two-image selection mode.

Regarding each mode, a predetermined mode may be set by default or a user may select and set a desired mode in advance. This mode setting information is stored in the memory 13. When this display control processing is specified from the user, the control unit 14 loads the mode setting information stored in the memory 13 and performs display control processing corresponding to this loaded mode setting information.

When the user selects this two-image selection mode, the user performs an operation for displaying a general menu on the display unit 5 and performs an operation for selecting an image-list display menu from this general menu. Upon detecting this operation for selecting image-list display menu, the control unit 14 loads the mode setting information stored in the memory 13 to recognize a mode set by default or set by the user in advance. The control unit 14 then controls execution of an operation in the recognized mode on the basis of the display control program stored in the memory 13.

[Operation in Manual Selection Mode of Two-Image Selection Mode]

Figure 11:
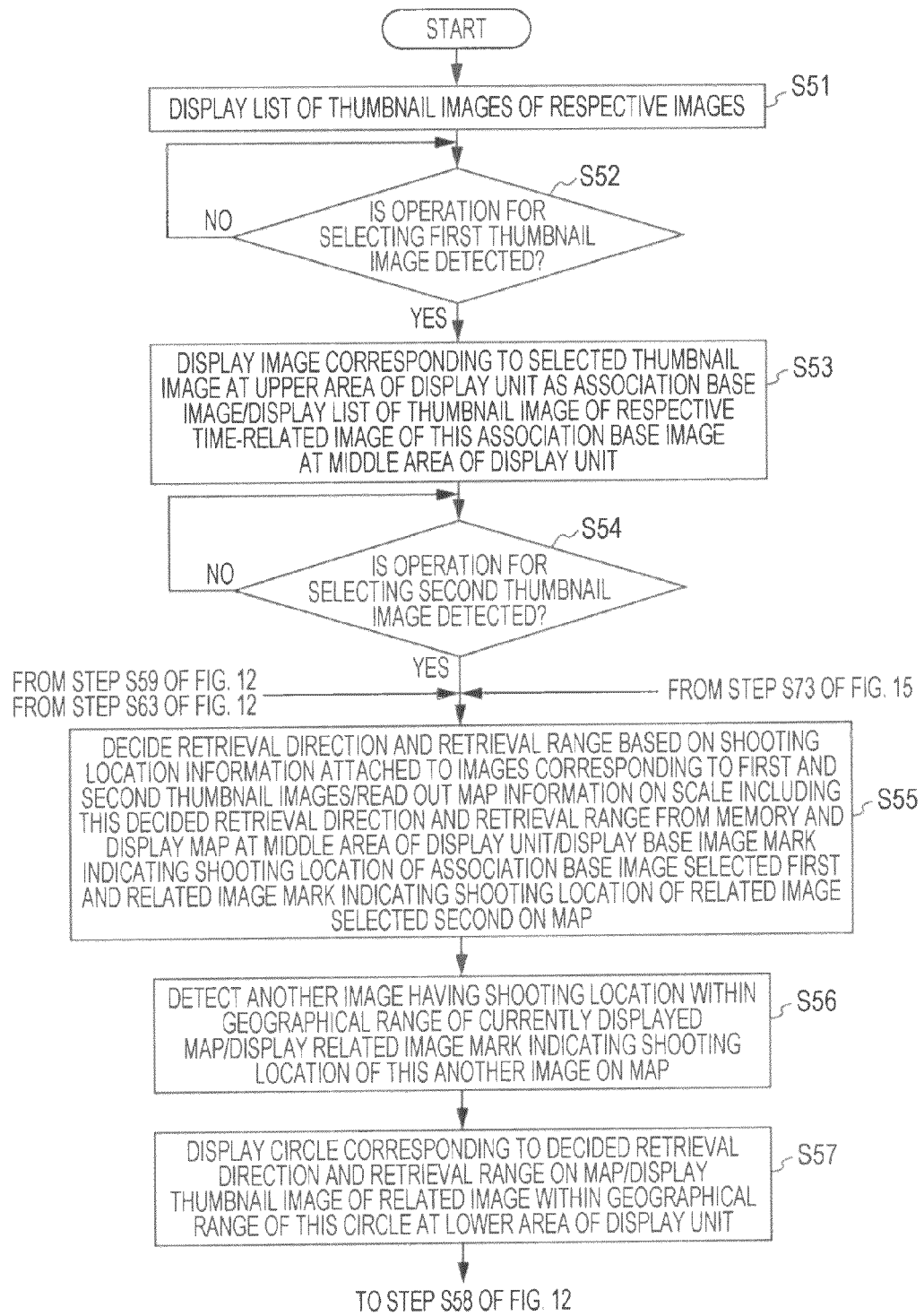
FIG. 11 is a flowchart for describing a first half operation of the mobile phone serving as the embodiment in a manual selection mode of a two-image selection mode.
Figure 12:
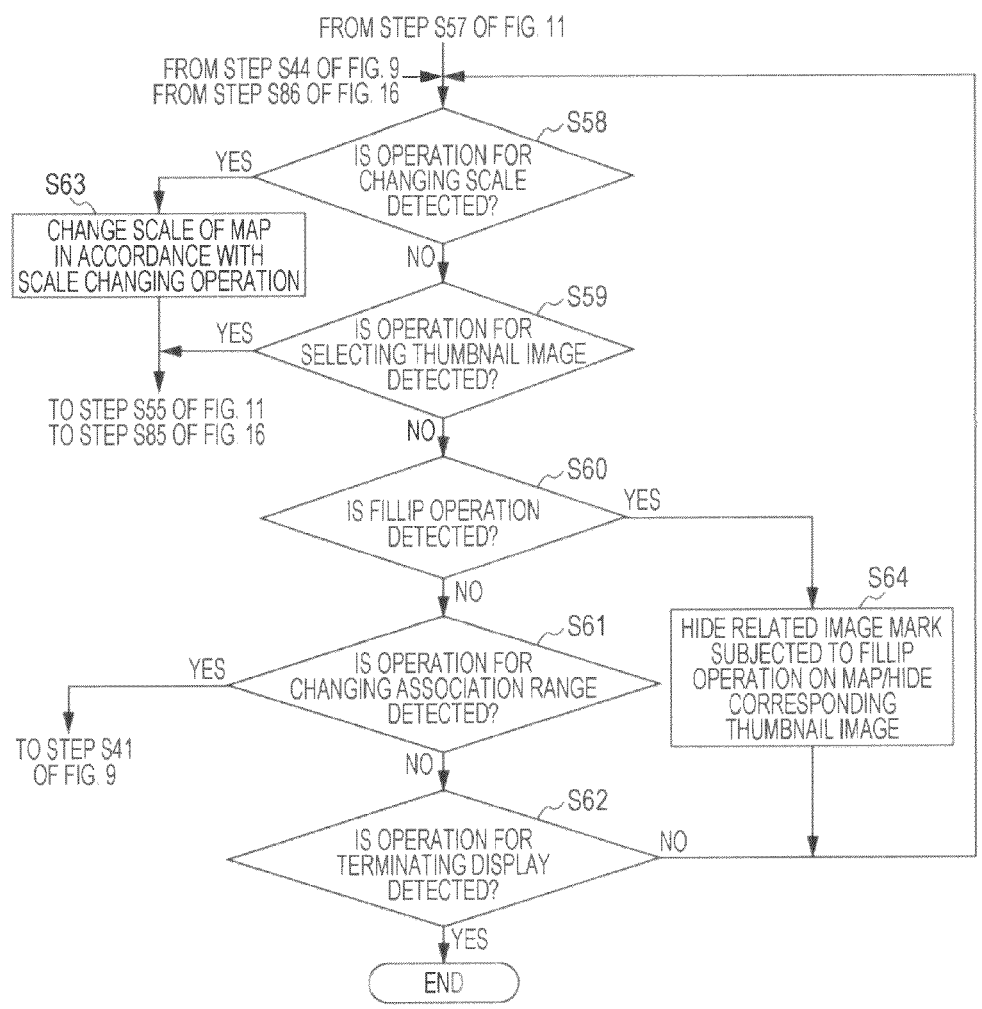
FIG. 12 is a flowchart for describing a latter half operation of the mobile phone serving as the embodiment in the manual selection mode of the two-image selection mode.

When the manual selection mode of the two-image selection mode is specified by the mode setting information, the control unit 14 first executes a chain of display control processing illustrated in flowcharts of FIG. 11 and FIG. 12 on the basis of the display control program.

Figure 13A:
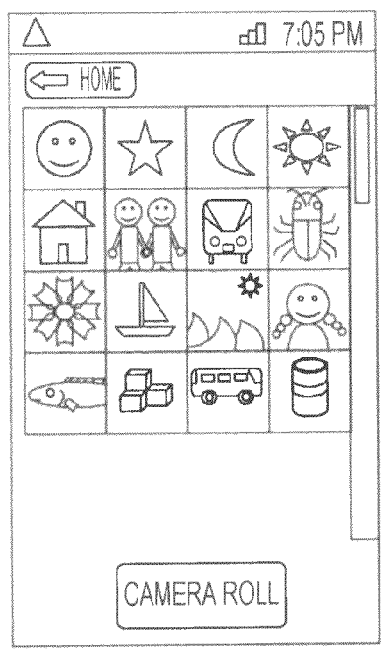
FIG. 13 is a diagram illustrating an example of display screens in the manual selection mode of the two-image selection mode.

In STEP S51 of the flowchart of FIG. 11, the control unit 14 first forms thumbnail images of still images and moving images stored in the memory 13 and controls displaying of a list of these on the display unit 5 as illustrated in FIG. 13(a). The process then proceeds to STEP S52. When forming a thumbnail image of a moving image, the control unit 14 forms a thumbnail image of a still image of one starting frame of the moving image or forms a thumbnail image of a still image of one frame corresponding to a time point that is predetermined time has passed from a start of the moving image and displays the thumbnail image on the display unit 5.

The user performs an operation for selecting a desired thumbnail image from this displayed list of thumbnail images. In STEP S52, the control unit 14 monitors presence or absence of this operation for selecting the first thumbnail image. Once the control unit 14 detects the selection operation, the process proceeds to STEP S53.

Figure 13B:
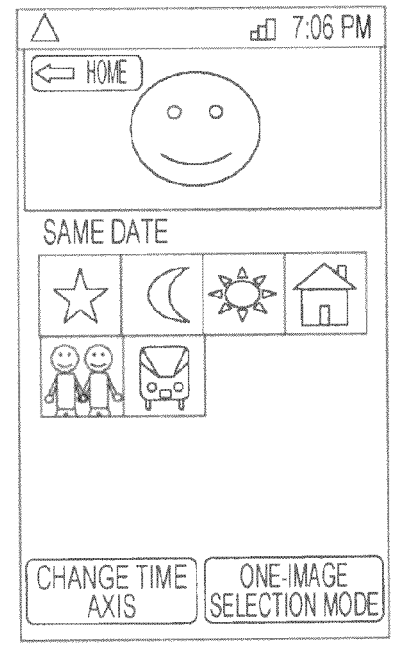

In STEP S53, the control unit 14 reads out an image corresponding to the selected first thumbnail image from the memory 13 as an association base image and displays this at an upper area of the display unit 5 as illustrated in FIG. 13(b). The control unit 14 also reads out related images shot on the same date as this association base image from the memory 13, forms thumbnail images of the related images, and displays a list of these at a middle area of the display unit. The process then proceeds to STEP S54.

Additionally, the control unit 14 displays a "time-axis changing button" for specifying changing of a time axis for use in retrieval of images on the display unit 5 with the thumbnail image of each of the time-related images as illustrated in FIG. 13(b). As described above, every time a touch operation is performed on this "time-axis changing button", the control unit 14 sequentially changes the time axis, such as related images shot on the same week as the association base image→related images shot in the same month as the association base image→related images shot in the same year as the association base image→related images shot in the same season as the association base image→related images shot on the same date as the association base image, and so on, to retrieve time-related images of the association base image and displays a list of thumbnail images thereof on the display unit 5.

In addition, the control unit 14 displays a "one-image selection mode specifying button" for specifying display in the above-described one-image selection mode on the display unit 5 with this "time-axis changing button". If the user performs a touch operation on this "one-image selection mode specifying button", the control unit 14 suspends the two-image selection mode, shifts into the above-described one-image selection mode, and executes the processing illustrated in the flowchart of FIG. 2.

The user then performs an operation for selecting a desired thumbnail image (i.e., a second thumbnail image) from the thumbnail images of the respective related images displayed as a list in this way. In STEP S54, the control unit 14 monitors presence or absence of this operation for selecting the second thumbnail image. Once the control unit 14 detects the operation for selecting the second thumbnail image, the process proceeds to STEP S55.

In STEP S55, the control unit 14 reads out shooting location information attached to the image corresponding to the first selected thumbnail image (i.e., shooting location information of the association base image) from the memory 13 and reads out shooting location information attached to an image corresponding to the second selected thumbnail image (i.e., shooting location information of a related image) from the memory 13. The control unit 14 then decides the retrieval direction and the geographical range of the retrieval (the retrieval range) on the basis of the shooting location information of the association base image and the shooting location information of the related image.

More specifically, the control unit 14 decides, as the retrieval direction, a direction of the shooting location of the related image corresponding to the second selected thumbnail image relative to the shooting location of the association base image corresponding to the first selected thumbnail image. The control unit 14 also calculates a distance between the shooting location of the association base image corresponding to the first selected thumbnail image and the shooting location of the related image corresponding to the second selected thumbnail image to decide a range including the shooting locations of these two images as the retrieval range. That is, the shooting locations of the respective images corresponding to the two thumbnail images selected by the user serve as parameters for deciding the retrieval range and the retrieval direction in the two-image selection mode.

After deciding the retrieval direction and the retrieval range in this way, the control unit 14 reads out map information on a scale including the decided retrieval direction and retrieval range from the memory 13 and displays it at the middle area of the display unit 5 in STEP S55. The control unit 14 also displays the base image mark indicating the shooting location of the association base image selected as the first image and the related image mark indicating the shooting location of the related image selected as the second image on the map. The process then proceeds to STEP S56.

In STEP S56, the control unit 14 detects other images having shooting locations inside the geographical range of the currently displayed map from the memory 13 and displays the related image marks indicating the shooting locations of these other images on the map. The process then proceeds to STEP S57. In STEP S57, the control unit 14 displays a circular image corresponding to the decided retrieval direction and retrieval range on the map. The control unit 14 also displays a list of thumbnail images of the related images belonging to the geographical range inside this circle at the lower area of the display unit 5. The process then proceeds to STEP S58 of the flowchart of FIG. 12.

Figure 13C:
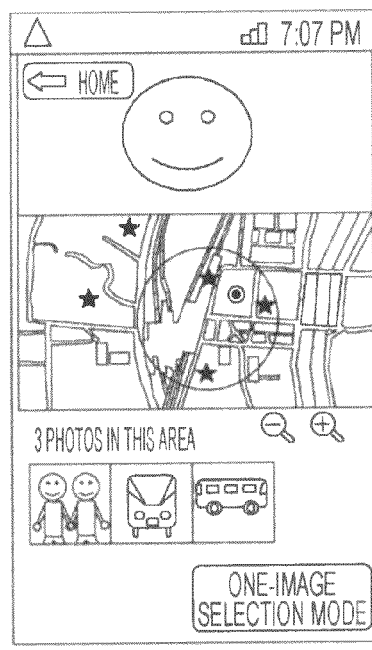

In this way, the association base image selected as the first image is displayed at the upper area of the display unit 5 as illustrated in FIG. 13(c). Additionally, the base image mark of the association base image selected as the first image and the related image marks of the related images that are time-related to the association base image and belong to the retrieval direction and retrieval range decided based on the shooting location of the association base image and the shooting direction of the related image selected as the second image are displayed at the middle area of the display unit 5. Furthermore, the list of thumbnail images of the related images belonging to the geographical range inside the circle on the map is displayed at the lower area of the display unit 5.

The control unit 14 then displays each of a scale enlarging button, i.e., a sign "+", and a scale reducing button, i.e., a sign "−", at around a lower right area of the map image in this two-image selection mode. If the user performs a touch operation on the scale enlarging button of the sign "+", the control unit 14 gradually reads out map information on a larger scale from the memory 13 in accordance with a duration of this touch operation and displays this on the display unit 5. In this way, by performing the touch operation on the scale enlarging button of the sign "+", a map on a larger scale (i.e., a map in which a narrow alley and a narrow land are enlarged: a map of a narrower display range) is gradually displayed on the display unit 5.

In contrast, if the user performs a touch operation on the scale reducing button of the sign "−", the control unit 14 gradually reads out map information on a smaller scale from the memory 13 in accordance with a duration of this touch operation and displays this on the display unit 5. In this way, by performing the touch operation on the scale reducing button of the sign "−", a map on a smaller scale (i.e., a map of a wider display range) is gradually displayed on the display unit 5.

Additionally, in the mobile phone according to this embodiment, the user can perform operations for enlarging and reducing the map by performing a touch operation on the display unit 5 constituted as a so-called touch panel. In one example, if the user touches the middle area of the display unit 5 displaying the map with their abutting thumb and forefinger and performs an operation for gradually increasing a distance between the abutting thumb and forefinger in this state (an enlargement specifying operation), the control unit 14 gradually reads out map information on a larger scale from the memory 13 in accordance with this enlargement specifying operation and displays this on the display unit 5. In this way, a map on a larger scale (i.e., a map in which a narrow alley and a narrow land are enlarged) is gradually displayed on the display unit 5 in accordance with the enlargement specifying operation.

Additionally, if the user touches the middle area of the display unit 5 displaying the map with their thumb and forefinger separated from each other at a distance of 3-5 centimeters, for example, and performs an operation for gradually decreasing the distance between the thumb and the forefinger in this state (a reduction specifying operation), the control unit 14 gradually reads out map information on a smaller scale from the memory 13 in accordance with this reduction specifying operation and displays this on the display unit 5. In this way, a map on a smaller scale (i.e., a map in which a narrow alley and a narrow land are enlarged: a map of a narrower display range) is gradually displayed on the display unit 5 in accordance with the reduction specifying operation.

In STEP S58 of the flowchart of FIG. 12, the control unit 14 monitors presence or absence of an operation for changing the scale of the currently displaying map by the touch operation on such a scale enlarging button or a scale reducing button, the enlargement specifying operation, or the reduction specifying operation. If the control unit 14 detects such an operation for changing the scale of the map, the process proceeds to STEP S63. As described above, the control unit 14 reads out map information on a scale corresponding to the scale changing operation from the memory 13 and displays it at the middle area of the display unit 5. The process then returns to STEP S55 of the flowchart of FIG. 11.

When the control unit 14 reads out the map on the scale corresponding to the scale changing operation from the memory 13, the control unit 14 reads out map information on a scale corresponding to the scale changing operation and displays it at the middle area of the display unit 5 so that the retrieval direction decided based on the shooting location of the association base image and the shooting location of the related image selected as the second image is handled. That is, the control unit 14 reads out the map information on the scale in a direction corresponding to the retrieval direction and corresponding to the scale changing operation from the memory 13 and displays the map at the middle area of the display unit 5.

After the control unit 14 reads out the map information on the scale corresponding to the scale changing operation from the memory 13 and displays it at the middle area of the display unit 5 in STEP S63, the process returns to STEP S55 of the flowchart of FIG. 11. In this STEP S55, the control unit 14 displays the shooting location of the association base image with the base image mark of a double circle and displays the shooting location of each image that is time-related to the association base image and corresponds to the retrieval direction with the related image mark of a star, for example, on the map (see FIG. 6(b) and FIG. 6(c)).

Additionally, the control unit 14 displays the shooting location of an image close to the shooting locations of the association base image and each of the related images with the related image mark on the map in STEP S56. In STEP S57, the control unit 14 displays a circle corresponding to the decided retrieval direction and retrieval range on the map and displays thumbnail images of the related images belonging to the geographical range inside this circle at the lower area of the display unit 5.

When the user wants to display an image corresponding to a desired thumbnail image from the list of thumbnail images displayed at the lower area of the display unit 5 (i.e., the images having the shooting locations within the range of the circle on the map) as illustrated in FIG. 13(c), the user next performs a touch operation on the display area of the display unit 5 corresponding to the desired thumbnail image.

In STEP S59 of the flowchart of FIG. 12, the control unit 14 monitors presence or absence of this touch operation on the display area of the display unit 5 corresponding to the thumbnail image. If the control unit 14 detects this touch operation, the process returns to STEP S55 of the flowchart of FIG. 11. The control unit 14 sets a shooting location of the related image corresponding to the thumbnail image selected through this touch operation of the user as the shooting location of the image selected as the second image and decides the retrieval direction and the retrieval range relative to the shooting location of the association base image (i.e., the image selected as the first image). The control unit 14 then reads out map information on a scale including this decided retrieval direction and retrieval range from the memory 13 and displays it at the middle area of the display unit 5. The control unit 14 also displays the base image mark indicating the shooting location of the association base image and the related image mark indicating the shooting location of the related image selected by the user in STEP S59 on the map.

In addition, in STEP S56, the control unit 14 detects other images having shooting locations within the geographical range of the currently displayed map and displays the related image marks indicating the shooting locations of these other images on the map. In STEP S57, the control unit 14 displays a circle corresponding to the decided retrieval direction and retrieval range on the map and displays thumbnail images of the related images belonging to the geographical range inside this circle at the lower area of the display unit 5.

When the user wants to hide the related image mark of an unnecessary shooting location out of the related image marks on the map displayed at the middle area of the display unit 5 as illustrated in FIG. 13(c), the user next performs an operation for filliping this unnecessary related image mark with their finger (a fillip operation).

In STEP S60 of the flowchart of FIG. 12, the control unit 14 monitors presence or absence of this fillip operation. If the control unit 14 detects the fillip operation, the process proceeds to STEP S64. The control unit 14 hides the related image mark subjected to the fillip operation on the map and hides the corresponding thumbnail image (see FIG. 6(a) and FIG. 7(a)).

When many related image marks are displayed on the map or the like, for example, the user can easily organize the related image marks displayed on the map and the thumbnail images in the displayed list by simply performing an operation for filliping the related image mark that seems to be unnecessary with their finger (the fillip operation).

Meanwhile, when the fillip operation is performed on the unnecessary related image mark on the map, the related image mark subjected to this fillip operation is hidden on the map and the thumbnail image corresponding to the related image mark subjected to the fillip operation is also hidden in this example. However, this may be configured so that, when the fillip operation is performed on an unnecessary thumbnail image from each thumbnail image displayed as a list, the thumbnail image subjected to this fillip operation is hidden and the related image mark on the map corresponding to the thumbnail image subjected to the fillip operation is also hidden.

Additionally, although the fillip operation can be performed only on the related image mark, this may be configured so that the fillip operation can be performed on the base image mark. When the fillip operation is performed on the base image mark, the control unit 14 newly changes the displayed related image mark, out of the related image marks inside the circle on the map, that is the closest to the base image mark subjected to the fillip operation to the base image mark. The control unit 14 also reads out an image corresponding to this new base image mark from the memory and displays it at the upper area of the display unit 5.

The control unit 14 repeatedly controls execution of display control of related images based on the shooting location of each image in such a manual selection mode of the two-image selection mode until the control unit 14 detects a display termination operation (i.e., a touch operation on the Home button) of the user in STEP S62.

Meanwhile, in this example, the shooting location of the association base image is displayed with a mark of a double circle (the base image mark) on the map and the shooting location of the time-related image of the association base image or the related image geographically related to the association base image is displayed with a star mark (the related image mark) on the map in the map display mode. However, thumbnail images may be displayed on the map instead of these base image mark and related image mark.

[Operation for Changing Association Range in Two-Image Selection Mode]

The user can next freely change the association range indicated by the circular image by performing an operation for expanding, shrinking, and deforming the circular image on the map in such a two-image selection mode.

More specifically, when the user changes the association range, the user performs a touch operation on one point of a perimeter part of the circle displayed on the map with their finger and slides the touching finger toward outside of the circle along a desired direction in this state (an one-point expanding operation) as indicated by an allow in FIG. 7(b). If this expanding operation is performed, the control unit 14 expands the circular image displayed on the map in accordance with the expanding operation as illustrated in FIG. 7(c). In this way, the association range that has been a perfect circle is changed to an oval association range extending in the direction of the expanding operation of the user.

Similarly, as indicated by an allow in FIG. 7(d), the user performs a touch operation on one point of the perimeter part of the circle displayed on the map with their finger and slides the touching finger toward inside of the circle along a desired direction in this state (a shrinking operation). If this shrinking operation is performed, the control unit 14 shrinks the circular image displayed on the map in accordance with the shrinking operation as illustrated in FIG. 8(a). In this way, the association range that has been a perfect circle is changed to an association range in a shape denting in each direction of the shrinking operation of the user.

Similarly, as indicated by an arrow in FIG. 8(b), the user performs a touch operation on two points of the perimeter part of the circle displayed on the map with their two fingers and slides the two touching fingers toward outside of the circle along a desired direction in this state (a two-point expanding operation). If this expanding operation is performed, the control unit 14 expands the circular image displayed on the map in accordance with the expanding operation as illustrated in FIG. 8(c). In this way, the association range that has been a perfect circle is changed to an oval association range extending in the direction of the expanding operation of the user.

Similarly, the user performs a touch operation on two points of the perimeter part of the circle displayed on the map with their two fingers and slides the two touching fingers toward inside of the circle along a desired direction in this state (a two-point shrinking operation). If this shrinking operation is performed, the control unit 14 shrinks the circular image displayed on the map in accordance with the shrinking operation as illustrated in FIG. 8(*d*). In this way, the association range that has been a perfect circle is changed to an association range in a shape denting in each direction of the shrinking operation of the user.

In STEP S61 of the flowchart of FIG. 12, the control unit 14 monitors presence or absence of such an association-range changing operation by the user. If the control unit 14 detects the association-range changing operation, the process proceeds to STEP S41 of FIG. 9.

In STEP S41, the control unit 14 expands, shrinks, and deforms the circular image displayed on the map in accordance with the association-range changing operation by the user. The control unit 14 also reads out a map on a scale corresponding to the association changing operation from the memory 13 and displays this at the middle area of the display unit 5. The process then proceeds to STEP S42. In this way, the scale of the map displayed on the display unit 5 is changed in accordance with the association changing operation.

In STEP S42, the control unit 14 detects related images having shooting locations included in the displayed map on the scale from the memory 13. The control unit 14 then displays the shooting location of each detected related image with the above-described related image mark of a star mark on the map. The process then proceeds to STEP S43.

In STEP S43, the control unit 14 forms thumbnail images of the respective related images corresponding to the related image marks displayed inside the circle on the map and displays these at the lower area of the display unit. The process then proceeds to STEP S44.

In STEP S44, the control unit 14 determines whether the above-described association-range changing operation is continued by the user. If the control unit 14 determines that the association-range changing operation is continued, the control unit 14 repeatedly executes the above-described processing of STEP S41 to STEP S43. If the control unit 14 determines that the association-range changing operation is terminated, the process returns to STEP S58 of the flowchart of FIG. 12.

Figure 14:
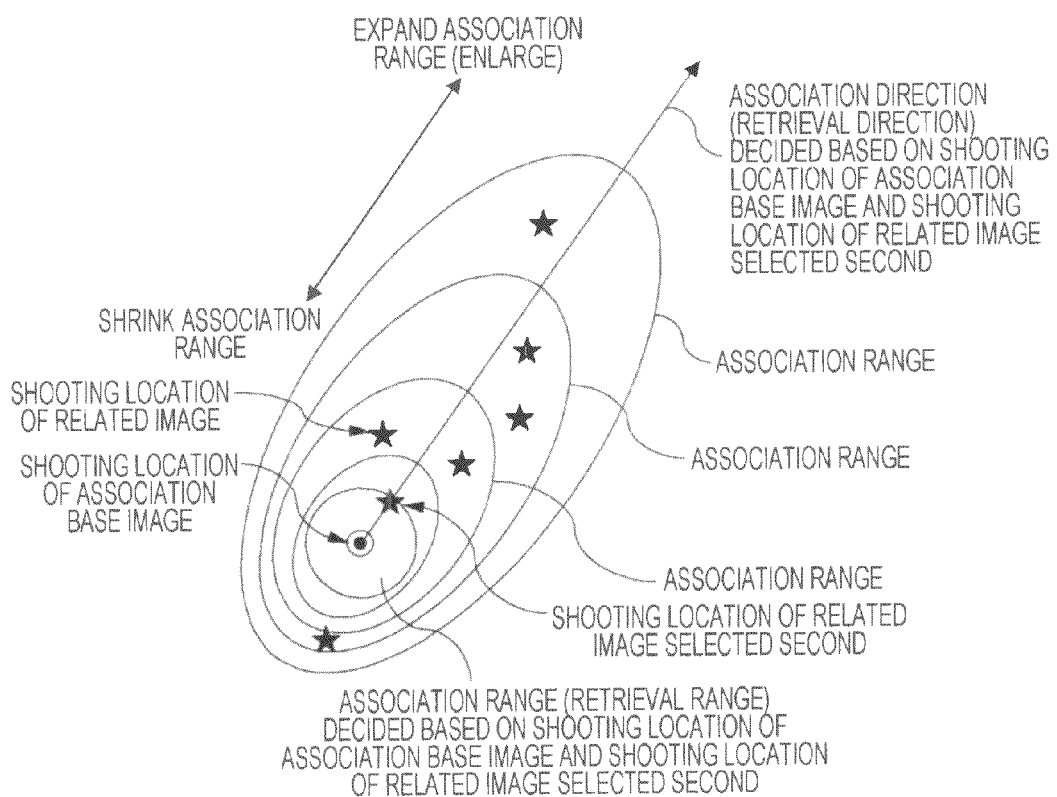
FIG. 14 is a diagram conceptually illustrating an operation for changing an association range in the manual selection mode of the two-image selection mode.

FIG. 14 is a conceptual diagram of such an association-range changing operation. As illustrated in this FIG. 14, the association-range changing operation in this two-image selection mode is an operation for expanding or shrinking the association range (the retrieval range) decided based on the shooting location of the association base image and the shooting location of the related image selected as the second image in a direction corresponding to the association changing operation of the user, detecting related images having shooting locations within the range indicated by this expanded or shrunk circle, and displaying the related images on the map.

Accordingly, if the user performs an expanding or shrinking operation of the circle in a desired direction on the map, the control unit 14 detects related images included in a geographical range indicated by the circle subjected to this expanding or shrinking operation and displays a list of thumbnail images of these related images on the display unit 5.

The mobile phone according to this embodiment allows the user to perform an operation for freely changing the association range by performing the expanding operation or the shrinking operation on the circle displayed on the map in the desired direction in this way even after a retrieval result based on the respective images selected as the first and second images is displayed. Accordingly, the user can easily and freely changes the retrieval range (i.e., the association range) in realtime while viewing the retrieval result and can retrieve the desired image. Thus, the user can rapidly retrieve and display the desired image without repeatedly performing a troublesome operation, such as a re-input operation of a retrieval value.

In such a manual selection mode of the two-image selection mode, once a desired image is selected as a first image from all of images stored in the memory 13, the control unit 14 detects images time-related to this first image from the memory 13 and displays thumbnail images of these related images on the display unit 5.

Once the thumbnail image corresponding to another desired image is selected from the thumbnail images of these related images as a second image, the control unit 14 decides the retrieval range and the retrieval direction on the basis of the shooting direction of the image selected as the first image and the shooting location of the image selected as the second image, detects each image corresponding to this decided retrieval range and retrieval direction from the memory 13, and displays a list on the display unit 5.

More specifically, in this case, the control unit 14 retrieves time-related images first and then displays a list of geographically related images out of the time-related images. Accordingly, when an image of a season in spring (i.e., an image in March to May) is selected as the first image, for example, images attached with time information of March to May stored in the memory 13 are retrieved. If a second desired image is selected from these images attached with the time information of March to May, a list of images that are attached with the time information of March to May and belong to the geographical range and direction corresponding to the first and second images is displayed.

This means that a list of images shot in the same season at the same place can be displayed. Accordingly, in this manual selection mode of the two-image selection mode, it is possible to retrieve images shot at an event held in a desired season at a desired place regardless of year of the event and display a list thereof.

[Operation in Automatic Selection Mode of Two-Image Selection Mode]

An operation in the automatic selection mode of the two-image selection mode will be described next. In the above-described manual selection mode of the two-image selection mode, a user performs an operation for selecting a desired image as the second image from a list of related images of an image selected as the first one. In contrast, in this automatic selection mode of the two-image selection mode, once the user selects a desired image from all of images stored in the memory 13, a retrieval range and a retrieval direction are decided on the basis of a shooting location of this image selected by the user and a shooting location of an image closest to the current location of the mobile phone and a list of images having shooting locations included in a geographical range corresponding to these decided retrieval range and retrieval direction is displayed.

Figure 15:
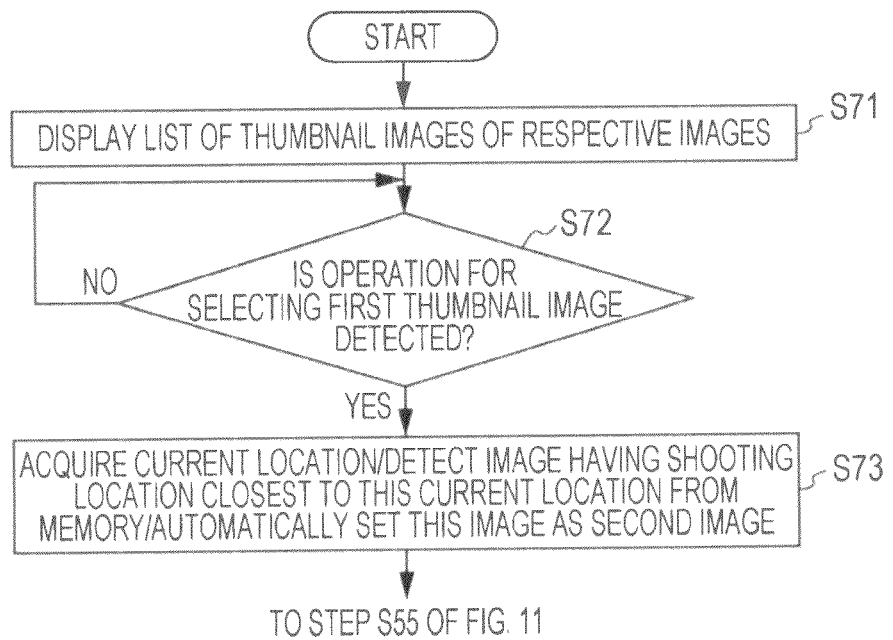
FIG. 15 is a flowchart for describing an operation of the mobile phone serving as the embodiment in an automatic selection mode of the two-image selection mode.
Figure 17A:
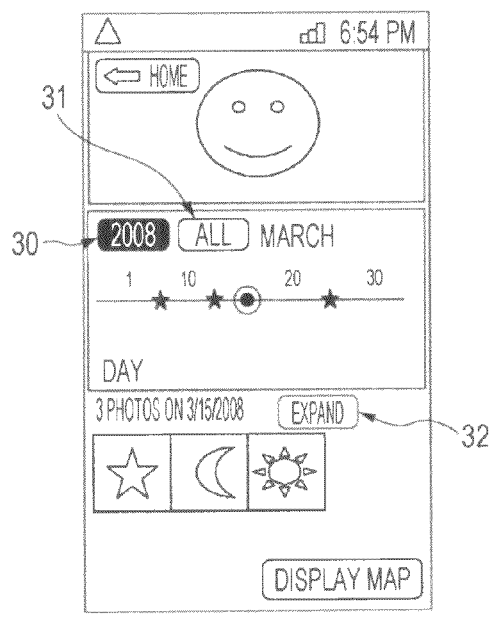
FIG. 17 is a diagram for describing an operation of the mobile phone serving as the embodiment for changing a time axis serving as a retrieval range.
Figure 17B:
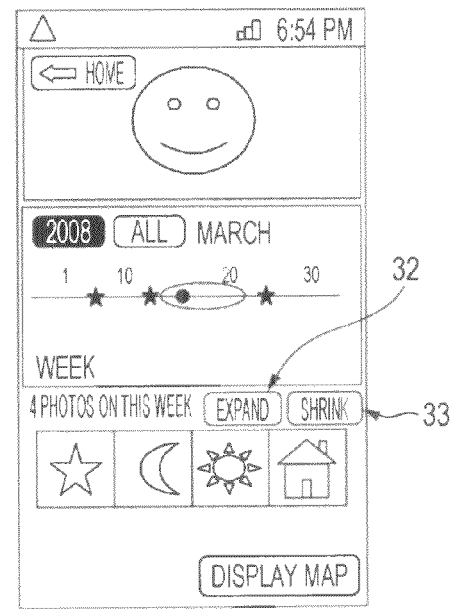
Figure 17C:
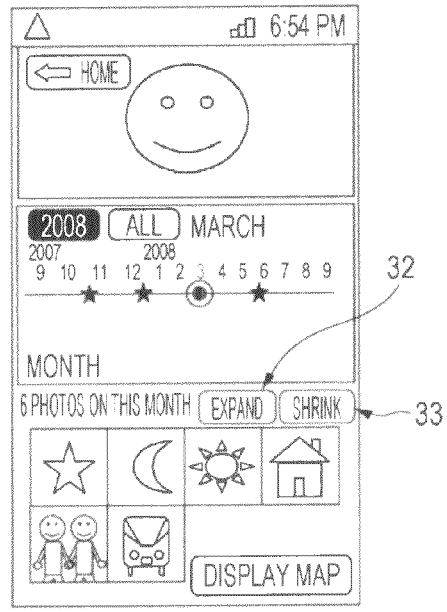
Figure 17D:
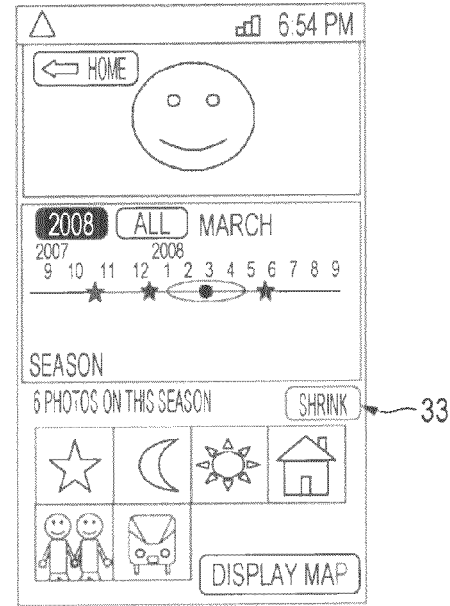

A flow of the operation in this automatic selection mode of the two-image selection mode is illustrated in a flowchart of FIG. 15. When the mode setting information stored in the memory 13 specifies the automatic selection mode of the two-image selection mode or when the user selects the automatic selection mode of the two-image selection mode from the operation menu, the control unit 14 starts processing illustrated in this flowchart of FIG. 15 on the basis of the display control program.

In STEP S71 of the flowchart of FIG. 15, the control unit 14 first forms thumbnail images of still images and moving images stored in the memory 13 and controls displaying of a list of these on the display unit 5 as illustrated in FIG. 13(*a*). The process then proceeds to STEP S72.

The user performs an operation for selecting a desired thumbnail image from this displayed list of thumbnail images. In STEP S72, the control unit 14 monitors presence or absence of this operation for selecting the first thumbnail image. Once the control unit 14 detects the selection operation, the process proceeds to STEP S73.

In STEP S73, the control unit 14 controls driving of the GPS unit 12 illustrated in FIG. 1 to acquire the current location of the mobile phone. The control unit 14 then detects an image having a shooting location closest to this current location from the memory 13 and automatically sets this image as the second image. The process then proceeds to STEP S55 of the flowchart of FIG. 11.

As described above, in STEP S55, the control unit 14 reads out shooting location information attached to an image corresponding to the first selected thumbnail image (i.e., shooting location information of an association base image) from the memory 13 and reads out shooting location information attached to the image that has the shooting location closest to the current location and is automatically set as the second image (i.e., shooting location information of a related information) from the memory 13.

In this STEP S55, the control unit 14 also decides the retrieval direction and the geographical range of the retrieval (the retrieval range) on the basis of the shooting location information of the association base image and the shooting location information of the related image, reads out map information on a scale including these decided retrieval direction and retrieval range from the memory 13, and displays it at the middle area of the display unit 5. The control unit 14 then displays the base image mark indicating the shooting location of the association base image selected as the first image and the related image mark indicating the shooting location of the related image automatically set as the second image on the map. The process then proceeds to STEP S56.

In STEP S56, the control unit 14 detects other images having shooting locations within the geographical range of the currently displayed map from the memory 13 and displays the related image marks indicating the shooting locations of these other images on the map. The process then proceeds to STEP S57. In STEP S57, the control unit 14 displays a circular image corresponding to the decided retrieval direction and retrieval range on the map. The control unit 14 also displays a list of thumbnail images of the related images belonging to the geographical range inside this circle at the lower area of the display unit 5.

Figure 9:
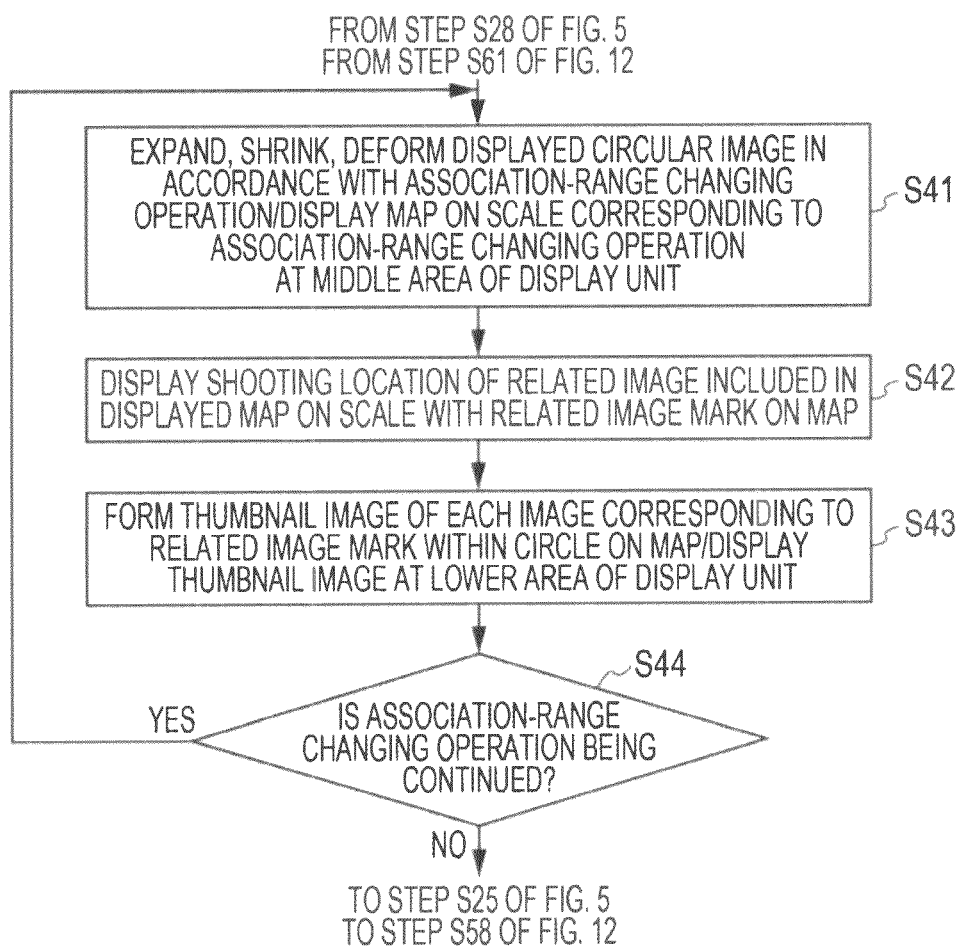
FIG. 9 is a flowchart for describing the operation for changing the association range in the map display mode.

Thereafter, the control unit 14 performs the association-range changing processing having been described using the flowchart of FIG. 9 as well as the processing for changing the scale of the map and the fillip processing having been described using the flowchart of FIG. 12.

In such an automatic selection mode of the two-image selection mode, once the user selects one desired image from a list of all images stored in the memory 13, an image having a shooting location closest to the current location of the mobile phone is automatically set as the second image. The retrieval direction and the retrieval range are decided on the basis of the shooting location of the first image selected by the user and the shooting location of the second image automatically set. The shooting location of each image geographically corresponding to these retrieval direction and retrieval range is displayed on a map. Additionally, a list of thumbnail images of the respective images is displayed.

Accordingly, the user simply performs an operation for selecting one desired image, thereby being able to collectively display shooting locations and thumbnail images of the related images related to this selected image on the display unit 5.

[Alteration of Automatic Selection Mode of Two-Image Selection Mode]

An alteration of the automatic selection mode of the two-image selection mode will be described next. In this altered automatic selection mode, once the user selects a desired image from all of images stored in the memory 13, a retrieval range and a retrieval direction are decided on the basis of a shooting location of the image selected by this user and a current location of the mobile phone and a list of images having shooting locations included in a geographical range corresponding to these decided retrieval range and retrieval direction is displayed. A flow of an operation in this alteration of the automatic selection mode is illustrated in a flowchart of FIG. 16.

In STEP S81 of the flowchart of FIG. 16, the control unit 14 first forms thumbnail images of still images and moving images stored in the memory 13 and controls displaying of a list of these on the display unit 5 as illustrated in FIG. 13(a). The process then proceeds to STEP S82.

The user performs an operation for selecting a desired thumbnail image from this displayed list of thumbnail images. In STEP S82, the control unit 14 monitors presence or absence of this operation for selecting the first thumbnail image. Once the control unit 14 detects the selection operation, the process proceeds to STEP S83.

In STEP S83, the control unit 14 controls driving of the GPS unit 12 illustrated in FIG. 1 to acquire the current location of the mobile phone. The process then proceeds to STEP S84.

In STEP S84, the control unit 14 decides the retrieval direction and the retrieval range on the basis of the shooting location information attached to the image corresponding to the first thumbnail image and the current location of the mobile phone acquired from the GPS unit 12. The control unit 14 reads out map information on a scale including these decided retrieval direction and retrieval range from the memory 13 and displays it at the middle area of the display unit 5. The process then proceeds to STEP S85.

In STEP S85, the control unit 14 displays the shooting location of the association base image selected as the first image with the base image mark on the map and also displays shooting locations of related images included in the geographical range of the displayed map with the related image marks on the map. The process then proceeds to STEP S86.

In STEP S86, the control unit 14 displays a circle corresponding to the decided retrieval direction and retrieval range on the map and displays thumbnail images of the related images belonging to the geographical range inside this circle at the lower area of the display unit 5. The process then proceeds to STEP S58 of the flowchart of FIG. 12.

Thereafter, the control unit 14 performs the association-range changing processing having been described using the flowchart of FIG. 9 as well as the processing for changing the scale of the map and the fillip processing having been described using the flowchart of FIG. 12.

In such an alteration of the automatic selection mode, the retrieval direction and the retrieval range are decided on the basis of the shooting location of the image selected from the list of all images stored in the memory and the current location of the mobile phone. The shooting location of each image geographically corresponding to these retrieval direction and retrieval range is displayed on the map. Additionally, a list of thumbnail images of the respective images is displayed.

Accordingly, the user simply performs an operation for selecting one desired image, thereby being able to collectively display shooting locations and thumbnail images of the related images related to this selected image on the display unit 5.

[Alteration of Time-related Mode of One-Image Selection Mode]

Next, in the time-related mode of the one-image selection mode having been described using the flowchart of FIG. 2, FIG. 3(*a*) to FIG. 3(*d*), and FIG. 4(*a*) to FIG. 4(*c*), a time axis for use in retrieval is changed in an order of "date", "week", "month", "year", "season", "date", and so on through an operation on the "time-axis changing button". However, this may be configured so that the time axis for use in retrieval is changed through an operation on other buttons as illustrated in FIG. 17(*a*) to FIG. 17(*d*).

In a case of this alteration, the control unit 14 displays a currently displayed time axis and a mark indicating presence of an image at a time point on the time axis at a middle display area between an association base image and related images related to the association base image as illustrated in FIG. 17(*a*) to FIG. 17(*d*).

The control unit 14 also displays a year selection button 30 for selecting a desired year, such as, for example, 2008 and 2009, and an all button 31 (All) for specifying all years as a retrieval target at an upper left marginal area of this middle display area.

The control unit 14 also displays a time-axis expansion specifying button 32 for specifying expansion of the time axis and a time-axis shrinkage specifying button 33 for specifying shrinkage of the time axis at around lower right area of the middle display area.

FIG. 17(*a*) illustrates an example of displaying a date-based time axis corresponding to the association base image shot on Mar. 15, 2008 at the middle display area. In this case, as illustrated in FIG. 17(*a*), the control unit 14 displays the association base image shot on Mar. 15, 2008 at the upper area of the display unit 5 and displays thumbnail images of a plurality of images shot on the same date, i.e., Mar. 15, 2008, as the association base image side-by-side at the lower area of the display unit 5.

Additionally, the control unit 14 displays the date-based time axis of March 2008 at the middle display area and displays the year selection button 30 of characters "2008" indicating that the currently selected year is 2008 and the all button 31 (All) for specifying all years as the retrieval target at the upper left marginal area of this middle display area.

The control unit 14 also displays a predetermined mark indicating presence of a shot image at a position, on the date-based time axis displayed at the middle display area, corresponding to a date on which the shot image exists.

Additionally, the control unit 14 displays a circular mark at the position, on the date-based time axis displayed at the middle display area, corresponding to March 15, thereby informing the user that the association base image and the related images shot on March 15 are currently displayed.

The control unit 14 also displays the time-axis expansion specifying button 32 for specifying expansion of the time axis at around the lower right area of the middle display area. Meanwhile, in one example, the mobile phone according to this alteration sets the date-based time axis as the finest time axis. Accordingly, when the date-based time axis is displayed, the control unit 14 does not display the time-axis shrinkage specifying button 33 for specifying shrinkage of the time axis as illustrated in FIG. 17(*a*).

Next, once the control unit 14 detects a touch operation on the time-axis expansion specifying button 32 illustrated in FIG. 17(*a*) with the date-based time axis being displayed in this manner, the control unit 14 switches and displays the time axis displayed at the middle display area in an order of a week-based time axis illustrated in FIG. 17(*b*), a month-based time axis illustrated in FIG. 17(*c*), and a season-based time axis illustrated in FIG. 17(*d*) every time the control unit 14 detects the touch operation on this time-axis expansion specifying button 32.

Additionally, when the week-based time axis is displayed, the control unit 14 retrieves each related image shot on a week as that is the same as the week on which the association base image is shot and displays this at the lower area of the display unit 5. When the month-based time axis is displayed, the control unit 14 retrieves each related image shot in a month that is the same as the month in which the association base image is shot and displays this at the lower area of the display unit 5. Furthermore, when the season-based time axis is displayed, the control unit 14 retrieves each related image shot in a season that is the same as the season in which the association base image is shot and displays this at the lower area of the display unit 5.

Conversely, once the control unit 14 detects a touch operation on the time-axis shrinkage specifying button 33 illustrated in FIG. 17(*d*) with the season-based time axis being displayed as illustrated in FIG. 17(*d*), the control unit 14 switches and displays the time axis displayed at the middle display area in an order of the month-based time axis illustrated in FIG. 17(*c*), the week-based time axis illustrated in FIG. 17(*b*), and the date-based time axis illustrated in FIG. 17(*a*) every time the control unit 14 detects the touch operation on this time-axis shrinkage specifying button 33.

Additionally, when the month-based time axis is displayed, the control unit 14 retrieves each related image shot in a month that is the same as the month in which the association base image is shot and displays this at the lower area of the display unit 5. When the week-based time axis is displayed, the control unit 14 retrieves each related image shot on a week that is the same as the week on which the association base image is shot and displays this at the lower area of the display unit 5. Furthermore, when the date-based time axis is displayed, the control unit 14 retrieves each related image shot on a date that is the same as the date on which the association base image is shot and displays this at the lower area of the display unit 5.

Next, if a touch operation is performed on the all button 31 (All) with one of the above-described time axes being displayed, the control unit 14 retrieves related images corresponding to all of the years of the currently displayed time axis and displays them on the display unit 5. For example, when the control unit 14 detects the touch operation on the all button 31 with the present date-based time axis corresponding to Mar. 15, 2008 being displayed, the control unit 14 detects related images corresponding to the date of March 15 in other years, such as 2006, 2007, 2009, and 2010, and displays these at the lower area of the display unit 5.

Similarly, if the control unit 14 detects the touch operation on the all button 31 with the present month-based time axis corresponding to March in 2008 being displayed, the control unit 14 detects related images corresponding to March in other years, such as 2006, 2007, 2009, and 2010, and displays these at the lower area of the display unit 5.

In this way, the mobile phone of this alteration can freely change the time axis through the touch operation on the time-axis expansion specifying button 32, the time-axis shrinkage specifying button 33, or the all button 31 and can retrieve and display related images time-related to the association base image. Accordingly, the mobile phone can freely, easily, and speedy change the retrieval range of related images and perform retrieval of a desired image.

[Mobile Phone Making Specification of Time Range and Geographical Range Available]

Next, specification of both of the above-described time range and geographical range may be made available in a mobile phone of this embodiment.

Figure 18:
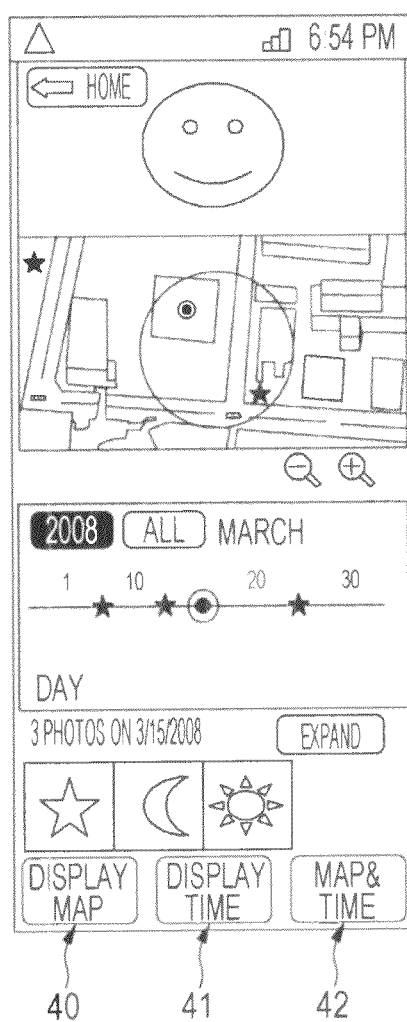
FIG. 18 is a diagram for describing a retrieval operation of the mobile phone serving as the embodiment using both a time range and a geographical range.

In a case of this mobile phone, the control unit 14 displays a time-range-based retrieval specifying button 40 for specifying retrieval using only the above-described time range, a geographical-range-based retrieval specifying button 41 for specifying retrieval only using the above-described geographical range, a geographical-and-time-based retrieval specifying button 42 for specifying retrieval using both of the time range and the geographical range at a marginal area of the display unit 5 as illustrated in FIG. 18.

Upon detecting a touch operation on this geographical-and-time-based retrieval specifying button 42, the control unit 14 then shifts into a geographical-and-time-based retrieval mode and displays an association base image, map information indicating a current geographical retrieval range, and a time axis indicating a current time retrieval range as illustrated in FIG. 18. The control unit 14 then retrieves related images of the association base image corresponding to this current geographical and time range and displays these on the display unit 5.

In this way, for example, images or the like shot in the same season at the same place can be retrieved. Accordingly, images, information, and so on related to an event held in a specific season at a specific place can be detected and displayed regardless of year.

[Alterations of Embodiment]

Although the above-described embodiment is an example applied to a mobile phone, the claimed invention can be applied to other electronic devices, such as, for example, a PHS (PHS: Personal Handyphone System), a PDA (PDA: Personal Digital Assistant), a digital camera, a digital camcorder, a notebook or desktop personal computer in addition to this mobile phone. In either case, the same advantages as those of the above-described embodiment can be obtained.

Lastly, the above-described embodiment is an example. Accordingly, it is added that the claimed invention is not limited to the above-described embodiment and it is a matter of course that the claimed invention can be variously altered in accordance with design or the like within a range not departing from the technical spirit according to the claimed invention.

[Reference Signs List]

1: antenna, 2: communication circuit, 3: speaker unit, 4: microphone unit, 5: touch-panel display unit, 6: light emitting unit (LED: Light Emitting Diode), 7: camera unit, 8: vibration unit, 9: timer, 10: acceleration sensor, 11: GPS antenna, 12: GPS unit, 13: memory, 14: control unit

What is claimed is:

1. A display apparatus, comprising:
an information selecting unit that selects at least one piece of information from a plurality of pieces of information stored in a memory based on an input from a user of a desired piece of information of the plurality of pieces of information, each of the plurality of pieces of information being attached with additional information, wherein the plurality of pieces of information are at least one of still image data, moving image data, and music data;
a retrieval range deciding unit that, after the at least one piece of information is selected, decides a retrieval range on the basis of the additional information attached to each piece of the information selected by the information selecting unit; and
a retrieving unit that retrieves and outputs additional pieces of information of the plurality of pieces of information corresponding to the retrieval range decided by the retrieval range deciding unit from the memory,
wherein the additional information is time information, and the retrieval range is a time frame proximal to the time information of the selected at least one piece of information, and the display apparatus further comprises a display unit that displays a calendar view indicating the time information of the selected at least one piece of information, the retrieval range, the additional pieces of information of the plurality of pieces of information corresponding to the retrieval range, and the calendar view displays a time axis which indicates the time information of the selected at least one piece of information in relation to the time information of the additional pieces of information of the plurality of pieces of information corresponding to the retrieval range with the indication of the time information of the selected at least one piece of information being displayed in a middle portion of the time axis.

2. The display apparatus according to claim 1, wherein the additional information is geographical location information, and the retrieval range is a geographical area surrounding the geographical location information of the selected at least one piece of information.

3. The display apparatus according to claim 2, wherein the retrieval range deciding unit is configured to receive an input to expand or shrink the retrieval range.

4. The display apparatus according to claim 2, further comprising:
a display unit that displays a map showing the geographical location information of the selected at least one piece of information, the retrieval range, and the additional pieces of information of the plurality of pieces of information corresponding to the retrieval range.

5. The display apparatus according to claim 4, wherein the display unit displays an area separate from the map that includes thumbnail images for the additional pieces of information of the plurality of pieces of information corresponding to the retrieval range.

6. The display apparatus according to claim 4, wherein the display unit displays an area separate from the map that includes thumbnail images for the additional pieces of information of the plurality of pieces of information corresponding to the retrieval range.

7. The display apparatus according to claim 1, further comprising:
an operation unit that receives the input from the user of the desired piece of information of the plurality of pieces of information,
wherein the information selecting unit selects at least two pieces of information from the plurality of pieces of information stored in the memory, one of the at least two pieces of information being first information that is selected by the user through the operation unit and another of the at least two pieces of information being second information that is automatically selected, and the retrieval range deciding unit decides a retrieval range on the basis of the additional information attached to the at least two pieces of information selected by the information selecting unit.

8. The display apparatus according to claim 7, wherein the additional information is geographical location information, the retrieval range is a geographical area surrounding the location information of the selected at least two pieces of information, and the retrieval range deciding unit is configured to receive an input to expand or shrink the retrieval range.

9. The display apparatus according to claim 7, further comprising:
a current location detecting unit that detects a current geographical location of the display apparatus,
wherein the additional information is geographical location information, and the second information is automatically selected on a basis of having geographical location information that is closest to the current location detected by the current location detecting unit.

10. The display apparatus according to claim 1, wherein the memory is provided in the display apparatus itself.

11. The display apparatus according to claim 1, wherein the memory is provided at an external device.

12. A method implemented on a display apparatus, comprising:
selecting at least one piece of information from a plurality of pieces of information stored in a memory based on an input from a user of a desired piece of information of the plurality of pieces of information, each of the plurality of pieces of information being attached with additional information, wherein the plurality of pieces of information are at least one of still image data, moving image data, and music data;
deciding, after the at least one piece of information is selected, a retrieval range on the basis of the additional information attached to each piece of the information selected; and
retrieving and outputting additional pieces of information of the plurality of pieces of information corresponding to the decided retrieval range from the memory,
wherein the additional information is time information, and the retrieval range is a time frame proximal to the time information of the selected at least one piece of information, and the method further comprises displaying a calendar view indicating the time information of the selected at least one piece of information, the retrieval range, the additional pieces of information of the plurality of pieces of information corresponding to the retrieval range, and the calendar view displays a time axis which indicates the time information of the selected at least one piece of information in relation to the time information of the additional pieces of information of the plurality of pieces of information corresponding to the retrieval range with the indication of the time information of the selected at least one piece of information being displayed in a middle portion of the time axis.

13. A non-transitory computer readable storage medium encoded with computer executable instructions, which when executed by a display apparatus, cause the display apparatus to perform a method comprising:
selecting at least one piece of information from a plurality of pieces of information stored in a memory based an input from a user of a desired piece of information of the plurality of pieces of information, each of the plurality of pieces of information being attached with additional information, wherein the plurality of pieces of information are at least one of still image data, moving image data, and music data;
deciding, after the at least one piece of information is selected, a retrieval range on the basis of the additional information attached to each piece of the information selected; and
retrieving and outputting additional pieces of information of the plurality of pieces of information corresponding to the decided retrieval range from the memory,
wherein the additional information is time information, and the retrieval range is a time frame proximal to the time information of the selected at least one piece of information, and the method further comprises displaying a calendar view indicating the time information of the selected at least one piece of information, the retrieval range, the additional pieces of information of the plurality of pieces of information corresponding to the retrieval range, and the calendar view displays a time axis which indicates the time information of the selected at least one piece of information in relation to the time information of the additional pieces of information of the plurality of pieces of information corresponding to the retrieval range with the indication of the time information of the selected at least one piece of information being displayed in a middle portion of the time axis.

* * * * *